US008965907B2

(12) United States Patent
Mital et al.

(10) Patent No.: US 8,965,907 B2
(45) Date of Patent: Feb. 24, 2015

(54) ASSISTED FILTERING OF MULTI-DIMENSIONAL DATA

(75) Inventors: Vijay Mital, Kirkland, WA (US); Brian C. Beckman, Newcastle, WA (US); Jason A. Wolf, Kirkland, WA (US); Janine Crumb, Redmond, WA (US); Darryl Ellis Rubin, Duvall, WA (US); Olivier Colle, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 12/819,493

(22) Filed: Jun. 21, 2010

(65) Prior Publication Data

US 2011/0314400 A1 Dec. 22, 2011

(51) Int. Cl.
*G06F 17/00* (2006.01)
*G06F 17/30* (2006.01)

(52) U.S. Cl.
CPC .... *G06F 17/30592* (2013.01); *G06F 17/30572* (2013.01); *G06F 17/30489* (2013.01)
USPC .......... 707/754; 715/764; 715/825; 715/833; 715/845

(58) Field of Classification Search
None
See application file for complete search history.

(56) References Cited

U.S. PATENT DOCUMENTS

| 6,512,530 | B1 | 1/2003 | Rzepkowski et al. | |
|---|---|---|---|---|
| 2002/0143800 | A1* | 10/2002 | Lindberg et al. | 707/201 |
| 2004/0163039 | A1* | 8/2004 | Gorman | 715/505 |
| 2005/0004911 | A1* | 1/2005 | Goldberg et al. | 707/7 |
| 2006/0107211 | A1 | 5/2006 | Mirtich et al. | |
| 2008/0184167 | A1 | 7/2008 | Berrill et al. | |
| 2010/0005420 | A1 | 1/2010 | Schneider | |
| 2010/0070489 | A1* | 3/2010 | Aymeloglu et al. | 707/722 |

OTHER PUBLICATIONS

Evans, Will, "Dynamic Visualization: Introduction & Theory," *Semantic Foundry LLC*, Jun. 1, 2009, 14 pages, http://blog.semanticfoundry.com/2009/06/01/dynamic-visualization-introduction-theory , downloaded Jun. 18, 2010.
Hibino et al., "Processing Incremental Multidimensional Range Queries in a Direct Manipulation Visual Query Environment," 8 pages, http://ieeexplore.ieee.org/stamp/stamp.jsp?tp=&arnumber=655808, published Feb. 1998, downloaded Jun. 18, 2010.
Webb et al., "The In-Context Slider: A Fluid Interface Component for Visualization and Adjustment of Values while Authoring," 8 pages, http://ecologylab.net/research/publications/icsAV108.pdf , published 2008, downloaded Jun. 18, 2010.
Yi et al., "Dust & Magnet: multivariate information visualization using a magnet metaphor," *Information Visualization* 4:239-256 (2005), 29 pages, http://www.palgrave-journals.com/ivs/journal/v4/n4/full/9500099a.html , downloaded Jun. 18, 2010.

* cited by examiner

*Primary Examiner* — Stephen Hong
*Assistant Examiner* — Keith Bloomquist
(74) *Attorney, Agent, or Firm* — Kevin Sullivan; Brian Haslan; Mickey Minhas

(57) ABSTRACT

Interactive and dynamic exploring of filter criteria for large amounts of numerical data having multiple dimensions is described. Exploration occurs without excessive amounts of computation or querying of a database based on a data set summary that may be obtained from a server in a search system and applied by a client device. A data set is summarized so as to capture relationships between distributions of items in the data set along multiple dimensions. To explore filter criteria, a user may interactively adjust a range of values that act as a filter criteria along a dimension and determine an effect on a distribution of items along another dimension. The client device may apply the data summary in reverse to determine, based on user input specifying aspects of a distribution along one dimension, filter criteria for another dimension that would result in the specified distribution.

20 Claims, 13 Drawing Sheets

| | Price | Beds | Bath | Square Feet | Year Built | Waterfront Square Feet | Foreclosed? |
|---|---|---|---|---|---|---|---|
| House 1 | $500k | 4 | 3 | 1800 | 2002 | 500 | N |
| House 2 | $650k | 5 | 4 | 2200 | 1998 | 1200 | Y |
| ... | ... | ... | ... | ... | ... | ... | ... |
| Condo 1 | $300k | 1 | 1 | 800 | 2005 | 0 | N |
| Condo 2 | $400k | 2 | 2 | 1000 | 2003 | 0 | N |
| ... | ... | ... | ... | ... | ... | ... | ... |
| Townhouse 1 | $500k | 3 | 2 | 1400 | 1995 | 400 | N |
| Townhouse 2 | $550k | 2 | 2 | 1250 | 2001 | 500 | Y |
| ... | ... | ... | ... | ... | ... | ... | ... |
| Multi-Family 1 | $700k | 5 | 4 | 2300 | 1992 | 1000 | Y |
| Multi-Family 2 | $800k | 6 | 4 | 2800 | 2000 | 1300 | N |
| ... | ... | ... | ... | ... | ... | ... | ... |
| Land 1 | $200k | N/A | N/A | 1500 | N/A | 1500 | N |
| ... | ... | ... | ... | ... | ... | ... | ... |

FIG. 4

ASSISTED FILTERING OF MULTI-DIMENSIONAL DATA

BACKGROUND

The availability of computer networks has become increasingly widespread, enabling people to access enormous quantities of information. Computer networks, such as the Internet, provide the ability to connect a computer user to numerous sources of information. As a result, people can obtain information about any number of things, including products, services and events.

While having access to a vast network of information, consumers that are searching for particular information are increasingly exposed to more and more amounts of data, much of which is extraneous. To find desired information, users may spend a great deal of time generating search queries and analyzing the results.

To aid users more quickly to find information that can be characterized by one or more numeric dimensions, it is known to include "sliders" in an interface of a search system. A slider is a control through which a user may specify a range of values that acts as a filter on search results. The search system will only return items from a data set generated in response to a search query when the items have a value for the dimension that falls within the range specified by the slider. For example, information about products for sale may include a dimension reflecting a price. By adjusting a slider associated with the price dimension, a user can cause the search system to limit results returned in response to a search query to only items having a price within the range specified by the slider. If items in a dataset can be characterized by multiple numeric dimensions, the search system may present multiple sliders.

To aid a user in setting values of sliders, it is known to display a data distribution along the slider. The distribution indicates, in graphical form, the number of items in the data set having specific values for the dimension.

SUMMARY

A search system includes features to aid a user specifying filter criteria to better obtain a desired amount of relevant information. The system may summarize a data set containing multiple items that have values in multiple dimensions. The summary may be delivered to a client device and be used to facilitate user interactions in which a user explores relationships between one or more filter criteria and numbers of items in a data set meeting the criteria.

Such a capability may be used in a mobile device or other client device connected to the search system over a low-bandwidth link. A user can explore filter criteria based on the summary, without a need for communication with a server, which may take a long time on a mobile device.

In some embodiments, a search system receives a search query from a user. The search system generates a data set, based on the query that includes items characterized by values in each of a plurality of dimensions. The search service generates a summary of the data set where the summary provides relationships that indicate the distribution, in one or more dimensions, of items in the data set that match filtering criteria in at least one of the dimensions. The filtering criteria can include a range of values of one dimension and any possible value or range of values for at least another dimension.

The summary of the data set may be used to provide an interactive graphical user interface on a client device. The user interface may indicate, for each of the dimensions of the data set, a distribution along the dimension of the items in the data set that have been filtered in accordance with a specified criteria in another dimension. The user interface may accept input that changes the specified criteria, and in response to which the displayed distributions may change. Alternatively or additionally, the user interface may accept input that changes a displayed distribution in one dimension, and in response suggested filter criteria in another dimension that would result in the indicated distribution may be displayed.

In some embodiments herein, such an interactive graphical user interface provides a user experience that allows a user to interactively explore filter criteria for large amounts of data. Once the user determines appropriate filter criteria, a filtered data set meeting that criteria may be obtained and presented to the user.

The experience described above is possible even on device with a computer processor having limited computational power or a low-bandwidth connection to a server that implements the search service.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is an example of a data set having a plurality of items, each with values according to a plurality of dimensions;

DETAILED DESCRIPTION

Figure 1:
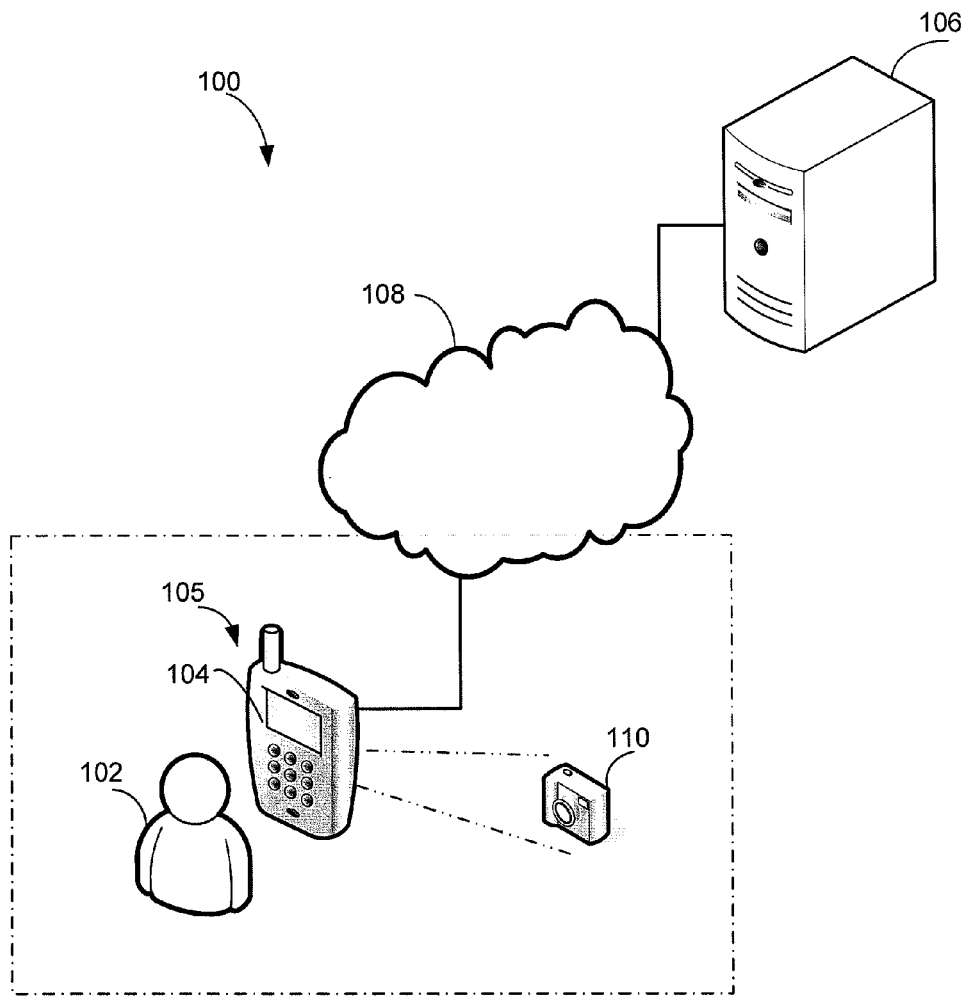
FIG. 1 is a high-level block diagram illustrating a computing environment in which some embodiments may be practiced.

The inventors have recognized and appreciated that it is often inefficient and cumbersome for users to specify filter criteria for data sets that have multiple dimensions. As items may have values in multiple dimensions, relationships between items in the data set according to those values may be difficult to visualize and therefore it may be difficult for a user to quickly select filter criteria in multiple dimensions that yield a desired amount of data.

In a conventional search system that is adapted for the user to provide filter criteria for one dimension at a time, the user can adjust a range of values (e.g., with a slider) that specify filter criteria in one dimension to see the number of items resulting after the filter criteria are applied. If the number of returned values is too high or too low, the user can change the filter criteria for that dimension or can adjust the range of values for another dimension to yield a different number of items. Particularly when the distributions in multiple dimensions are correlated, such an approach can be inefficient.

For example, for data related to houses, various dimensions may be correlated in ways that are not apparent to a user. Price, number of bedrooms and location may be correlated such that, as the user changes values of filter criteria in each of these dimensions, the number of houses meeting the criteria may vary in a way that cannot be easily appreciated by a user. As a specific example, a user may way to view listing of about 25 houses meeting the user's criteria. The user may specify filter criteria that to limit results to houses offered for sale for $250,000 to $300,000, with three bedrooms and within 10 miles of the center of a city. These criteria may be overly restrictive and return no houses matching the criteria. In response, the user may relax the filter criteria to include houses offered for less than $500,000, with 2 or more bedrooms and within 20 miles of the city center. These criteria may return substantially more than 25 houses because there are several neighborhoods about 12 to 15 miles from the city center that have houses offered for sale for $250,000 to $300,000, with three bedrooms.

In that case, the user's initial intent could have more nearly been met by expanding the filter criteria for distance from the city center to 12 miles. However, it may take the user multiple attempts at setting the filter criteria to eventually recognize this fact.

In a conventional system, the back and forth between the user's device and a server on which the search system executes required for the user to determine the appropriate criteria may be very time consuming, particularly if conducted over a narrow bandwidth channel. Accordingly, it is advantageous to provide the user with the ability to assess relationships between items in the data set according to filter criteria provided by the user for multiple dimensions at once.

Particularly when the user is interacting with a conventional search system through a mobile device, trial and error may be a frustrating experience because of the delays associated with using a relatively low bandwidth connection to send new filter criteria to a server where the criteria are applied and new results are sent back to the user. Continuing the example of a user searching for information on houses for sale, a system that quickly displays the effect on the distribution of offering prices when the filter criteria associated with distance is relaxed would allow a user to test the effect of each of multiple possible values of the distance criteria in excess of 10. As a result, the user may be able to quickly identify 12 miles as an appropriate filter criteria to yield a desired number of filtered search results. Similarly, by providing a system that computes for a user a value along the distance dimension that, if applied as a filter criteria, yields a filtered data set with a specified number of houses in the $250,000 to $300,000 price range, the user can quickly select appropriate filter criteria.

To support such exploration of filter criteria, in some embodiments, a search system may generate a summary of a data set returned in response to a user query. The summary may provide information on relationships between the dimensions, such as by providing information indicating distributions of items in the data set along some dimensions as a function of values along other dimensions. The summary may generated as sets of samples or other suitable representations of such joint distributions.

Regardless of the format of the summary, a device operated by a user may use this summary to allow a user to explore the effect of changing different filter criteria without back and forth with a server. Further, the summary may reveal relationships between filter criteria in different dimensions, which may further accelerate finding appropriate filter criteria. For the purpose of aiding user decision-making, the summary acts as if it were the whole, multi-dimensional data set, but at substantially lower cost in bandwidth and computation. The summaries displayed may be three-level approximations of the original data. First, the distribution histograms may already be a statistical summary, so the user knows to begin with that he is only looking at approximate data. Secondly, the user may employs a visual representation of the statistical summary—such as a histogram floating above a slider—subject to pixel quantization error and truncation error from down-scaling to a small screen. The user accepts these degradations because user's task is intrinsically approximate—it is a task of refining guesses. The additional summarization is an approximation of the statistical summary, again, to reduce costs, but the differences to the statistical summary are so small as to be likely invisible within the pixel and screen restrictions.

For example, when a user runs a search for desired information, a data set having items with values for a number of dimensions may be generated. The system may generate a summary of this data set. Using methods described herein, various filter criteria for the data set may be explored by a user in an efficient manner. The system may support multiple types of exploration based on the summary. For example, the device may receive user input specifying a change in filter criteria associated with a value in one dimension, regarded as a master dimension, and compute, using the summary, a distribution of the number of items in one or more other dimensions, regarded as subordinate dimensions. Alternatively or additionally, the device may receive user input specifying a value at a location in the distribution in a dimension, a subordinate dimension, and may compute, using the summary, a criteria in another dimension, regarded as the master dimension, that yields the specified value.

Thus, a search system is provided that assists a user in specifying multi-dimensional filter criteria for a data set to obtain desired information. So that exploring of filter criteria for the data set is efficiently conducted, the data set is summarized, such as by sampling of multi-dimensional distributions or representing multi-dimensional distributions by an appropriate set of calculations, to yield a data summary. The data summary may be transmitted to a client device (e.g., computer, mobile device) so as to facilitate interactive user exploration of filter criteria where a user can explore relationships between various filter criteria and numbers of items in the data set that meet the criteria without requiring multiple interactions between the client device and a server that executes search queries. By supporting exploration of filter criteria using the data summary, a user can dynamically explore filter criteria for a data set in a way that reduces computation that would occur if filtering queries were made directly of the data set. By supporting exploration on the client device, communication time is also reduced, providing further efficiency.

Once the data summary is calculated, a processor can use the summary to effectively model a number of results that would be returned if the data set were filtered based on filter criteria. Therefore, a user can input ranges for any of multiple dimension(s) and, based on the summary, the user is able to quickly receive an indication of the distribution of how many items within the data set fall within the user-specified range(s) for each dimension. The user can repeatedly adjust the range(s) for particular dimensions and automatically receive updated indications as to the corresponding number of items within the data set that fit within the specified criteria. Alternatively or additionally, the user can adjust the number of items for a particular value in a dimension and an indication can be automatically generated based on the summary of how the range of values for the original dimension should be varied to achieve the specified number of items.

In an embodiment, the data set is generated on a server computer, such as a search engine that operates according to known technology, and a processor on the server computer summarizes the data set. Though, it is not a requirement that the data summary be generated by the same device that generates the data set. In some embodiments, the data set is generated on a database computer and the summarization is performed by a processor on a separate computing device from the database computer.

Regardless of where the summary is generated, the data summary may be transmitted to a client device, which may contain a processor that interpolates between samples in the data set for modeling to the effect of inputted filter criteria. Though, the device that uses the summary to respond to user input is not critical to the invention. In some embodiments, the summary may be used on the server computer.

In some embodiments, dimensions of the data set, based on the summary, are displayed and accessed by a user on a graphical user interface. Each dimension can be represented by a slider on an interactive display where a range on the slider for the dimension can be easily adjusted through an appropriate user interface. The sliders may also include indications of the distribution of items within the filtered data set for at least a portion of the dimensions.

In some embodiments, a dimension may be designated, such as by user input, as a master dimension and other dimensions may be designated as subordinate dimensions. The system may show distributions for the subordinate dimensions of items in the data set that have been filtered based on a range of values specified for the master dimension. The distributions for one or more of the subordinate dimensions may be automatically adjusted dynamically on the interactive display as a user provides inputs relating to a range in the master dimension A user can repeatedly adjust the range of the master dimension as many times as desired and view changes in how the items that fall within the adjusted range(s) are distributed in the subordinate dimensions. Such a display may help a user visualize ranges of values of each of the dimensions that may serve as filter criteria that generate a filtered data set of a desired size and focus.

Alternatively or additionally, the user can provide input indicating a desired distribution of items in a subordinate dimension and the system can use the summary to quickly determine a range that can be specified as filter criteria in the master dimension that will yield the indicated distribution in the subordinate dimension. In some embodiments, the distributions are represented as histograms and user input relating to a desired distribution is provided by user input indicating a desired value for a bar in a histogram representing the distribution for the subordinate dimension. Regardless of how the desired distribution is specified, the system may use this input, and the data summary, to compute a range for the master dimension that, if applied as a filter criteria to the data set will yield the desired distribution in the subordinate dimension. The system may then dynamically change the display to indicate the range in the master dimension. The impact of the distributions in the subordinate dimensions may also be displayed. In this way, the user can explore the relationships between the dimensions to arrive at desired filter criteria, possibly including ranges of values in multiple dimensions.

The system may provide a user interface to support such exploration in any suitable fashion. Dynamic exploration of filter criteria can be performed by a user through the use of interactive sliders and bar graphs. The user can, using conventional techniques for graphical user interfaces, provide input that adjusts the range of a slider, corresponding to a dimension, on an interactive display. The system may dynamically compute and then display the distributions of items along one or more dimensions based on the user input. Likewise, conventional interface techniques may be used to specify a value for a bar in a bar graph and display computed results based on that input. Though, it should be appreciated that any suitable interface techniques may be used to receive user input and present to the user results of applying that input.

Regardless of the form of interface used, when the user has completed exploring the effects of filter criteria on the numbers of items returned, the user may indicate that the filter criteria should be applied by the search system to generate a filtered data set. This filtered data set may then be generated in a conventional manner, or in any other suitable way, providing items that the user can examine.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Though, in the embodiment illustrated, computing device 105 is a mobile device. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system.

In the example of FIG. 1, server 106 operates as a database server that implements a search service, allowing user 102 to access information relevant to a data store. The data store may be, for example, information posted on the Internet or may be a more limited data set, such as information available over a corporate Intranet or may be a database of a particular type of information, such as houses for sale. Accordingly, it should be appreciated that embodiments of the invention may operate in connection with any suitable data store.

To access information from the data store, the user may specify a query explicitly, such as by inputting query terms into computing device 105 in any suitable way, such as via a keyboard, key pad, mouse, or voice input. Additionally and/or alternatively, the user may provide an implicit query. For example, computing device 105 may be equipped with (or connected via a wired or wireless connection to) a digital camera 110. An image, such as of an object, a scene, or a barcode scan, taken from digital camera 110 may serve as an implicit query. Alternatively or additionally, a query may be generated implicitly by user input accessing a type of data base. For example, accessing a database containing houses for sale, may be an implicit query for information on houses for sale.

Regardless of the type of input provided by user 102 that triggers generation of a query, computing device 105 may send the query to server 106 to obtain information relevant to the query. Server 106 may generate a data set responsive to the query. The data set may be regarded as a set of items because it contains information about items selected in response to the query. The items may be selected because information about those items exactly matches the query. Though it should be appreciated that fuzzy or inexact matching techniques are known and may be applied. Accordingly, the specific technique by which the data set is generated is not critical to the invention.

Additionally, server 106 may apply filter criteria to limit items included in the data set. The filter criteria may be initially supplied as part of the search query. Though, server 106 may retain the initial data set generated in response to the search query as part of an interactive session with user 102. During that session, the user may specify through a user interface of device 105 filter criteria, which server 106 may then apply to generate a filtered data set that is then supplied to device 105 for display to the user.

The information generated by server 106 may be sent over computer network(s) 108 and be displayed on display 104 of computing device 105. Display 104 may be any suitable display, including an LCD or CRT display, and may be either internal or external to computing device 105.

Figure 2:
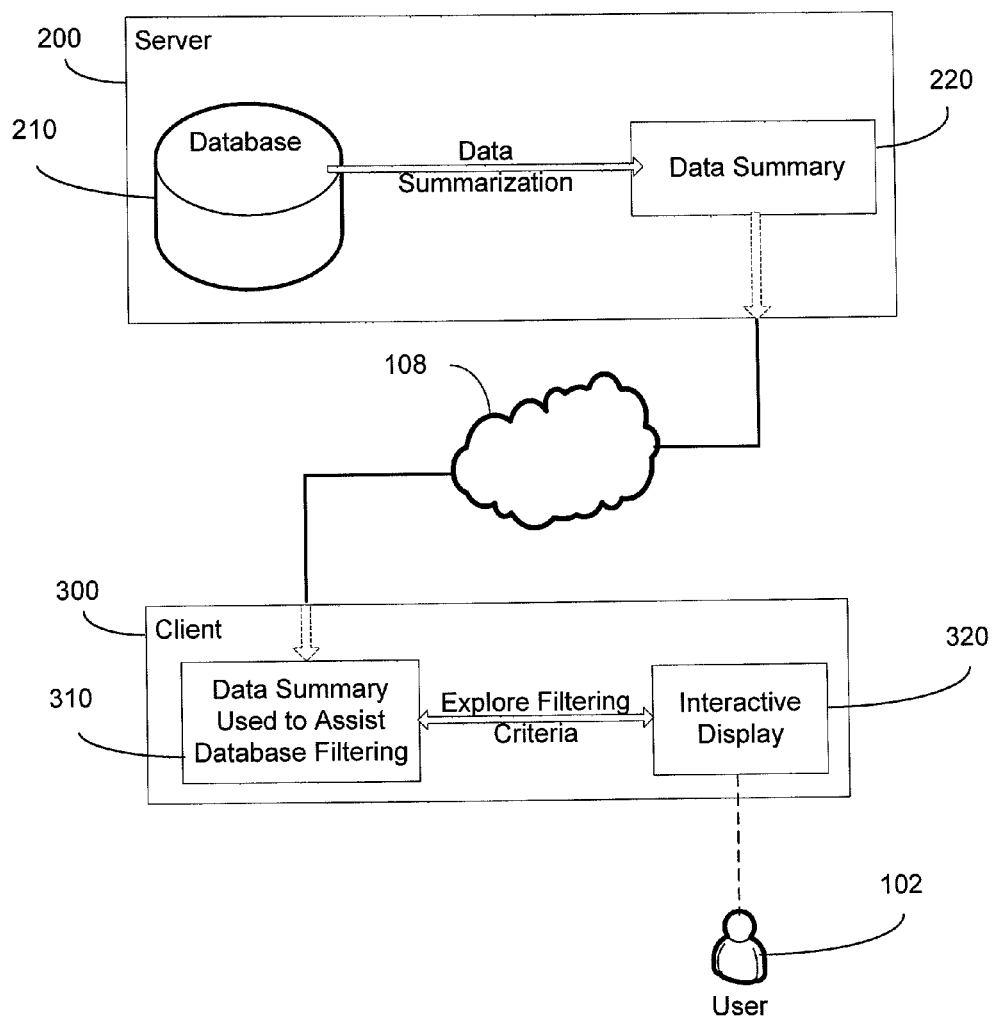
FIG. 2 is a schematic diagram of a system filtering data according to some embodiments.

The search session involving user 102 may include an exploration phase during which the user explores the effect of different filter criteria. FIG. 2 depicts an illustrative embodiment of a system that aids a user in filtering data through such exploration. Server computer 200 includes a database 210 from which a data set of items may be selected. Accordingly, server computer 200 may represent an implementation of server 106 (FIG. 1).

FIG. 2 continues to depict that a data set from database 210 is subject to a data summarization process that results in a data summary 220. The data summary 220 serves to approximate relationships between items having values according to different dimensions.

In an embodiment, the data summary 220 is downloaded through a communication network 108 to a client computer 300. The client computer 300 may be a mobile device, such as device 105 (FIG. 1), Though, client computer 300 may be any suitable computing device. The summary is processed on the client computer to enable a user to utilize the data summary in exploring filter criteria for the data set. As part of the exploration process, distributions of the items in the data set along multiple dimensions may be presented on an interactive display 320 of the client computer 300 so that a user 102 can interactively and efficiently explore filter criteria for the data set and determine a desired filter criteria. An interactive display 320 may be, for example, a graphical user interface.

It can be appreciated that in some embodiments, a user can interactively explore different filter criteria for a data set using a summary produced on the server computer 200 directly on the server. That is, a summarization is not required to be downloaded to a client computer for dynamic exploration of filter criteria by a user 102, as the computations performed with the summary while a user is exploring may be performed by a processor of server computer 200. Once exploring is completed by the user, either on the server computer or a client computer, the user may request that server computer 200 run apply those filter criteria to the data set to generate information from the database 210 based on the search query and desired filter criteria.

Figure 3A:
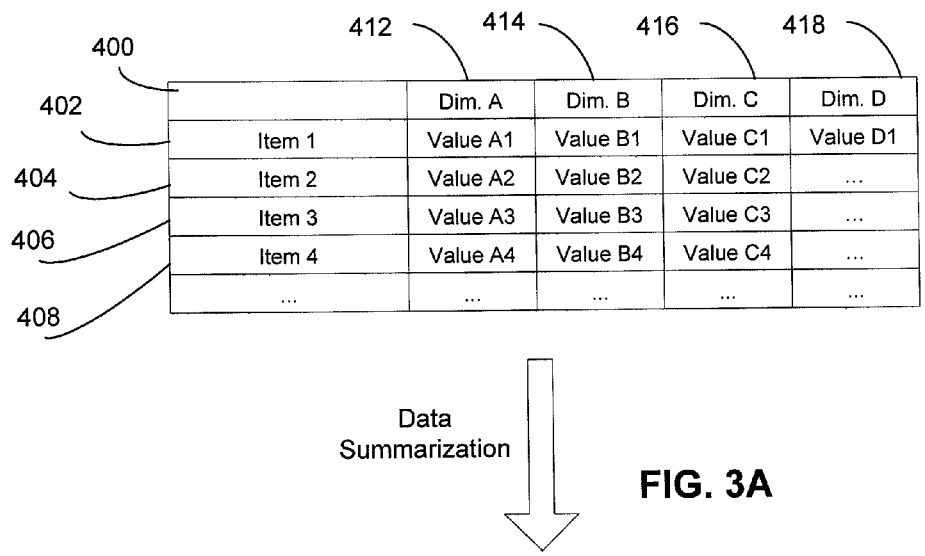
FIG. 3A is a schematic representation of a data set that is summarized into a graphical function.

FIG. 3A illustrates a schematic of the process within the server computer 200 of FIG. 2 where data that is stored in a data set is summarized into a data summary 220. In FIG. 3A, a data set 400 has been selected by processing on server 200. The data set is represented as information about a plurality of items. In this illustration, each of the items is represented as a row in a table. Though, it should be appreciated that FIG. 3A is a schematic representation of a data set and the data may be formatted in any suitable way.

The number and significance of the items may depend on the nature of the data store being search and the nature of the search query provided. Each item, for example, may represent a house for sale, a type of car, an employee in a company. Though, it should be appreciated that the nature of the items is not a limitation on the invention.

In this example, identifiers 402, 404, 406 and 408 that correspond to items in the data set are illustrated. As can be seen in FIG. 3A, each item in the data set contains multiple values that characterize the item. Each of the values is associated with a dimension that corresponds to a type of information.

Values for each dimension are represented in respective columns, of which columns 412, 414, 416 and 418 are illustrated. For example, the data set 400 depicted by FIG. 3A depicts Item 1 having Value A1 in Dimension A, Value B1 in Dimension B, . . . etc.

The number of dimensions and the significance of each dimension may depend on the nature of items in the data store and the amount of information that is available about those items. For example, if the items are products for sale, a dimension may represent a selling price of the item. If each item is a person, a dimension may represent an age of the person. Though, the dimensional may represent any characteristic of an item for which a value may be specified. Accordingly, it should be appreciated that the specific significance of each dimension is not critical to the invention.

As shown, the data set 400 may be summarized into a summary 450 by processing on server 200 or any other suitable device. Generally, the summarized data modeled by summary 450 is smaller and easier for a processor to handle than the actual data set 400. In some embodiments, summary 450 is represented by multiple sets of samples, each set of samples characterizing a distribution of items along one dimension based on a value or range of values that may be specified as a filter criteria in a different dimension.

Figure 3B:
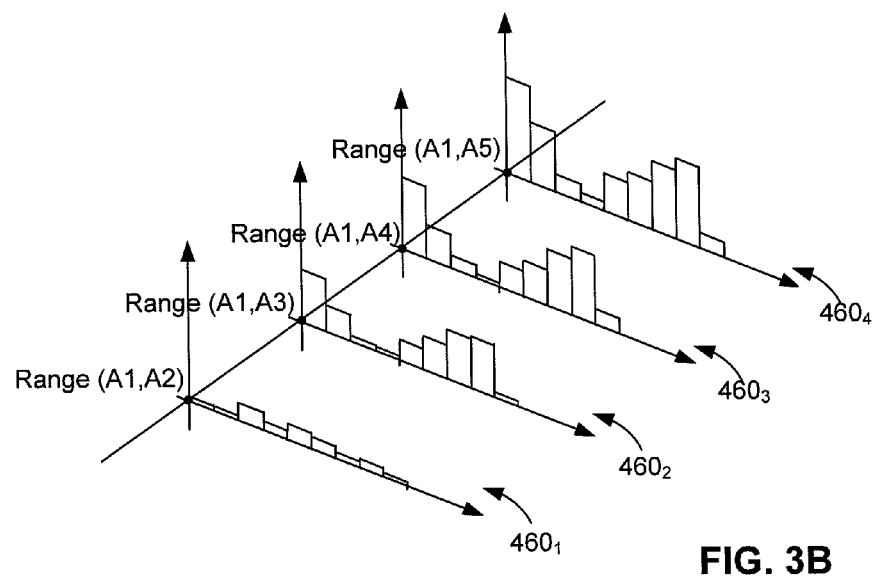
FIG. 3B is a schematic representation of a portion of a computation involved in summarizing the data set of FIG. 3A.
Figure 3C:
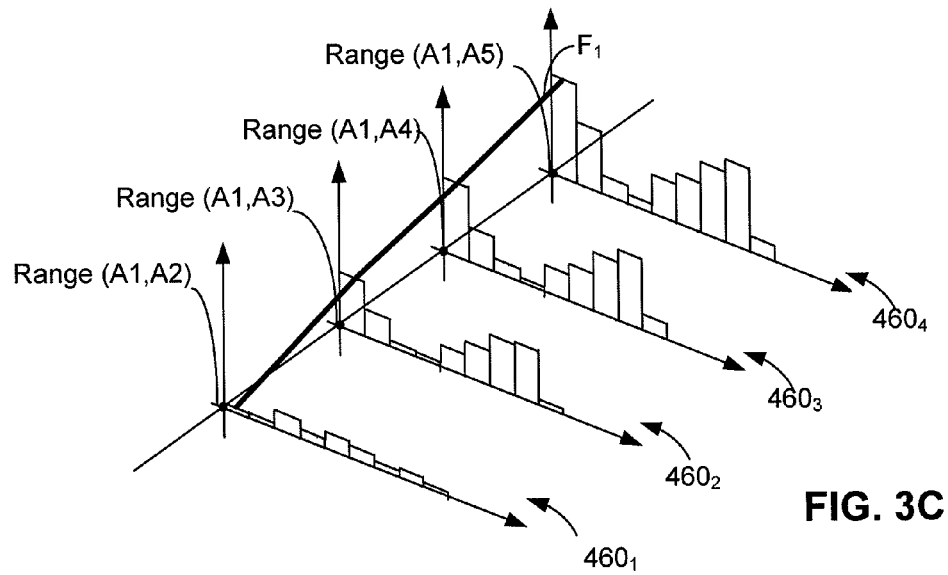
FIG. 3C is a schematic representation of a further portion of the computation used in generating a summary of the data set in FIG. 3A.
Figure 3D:
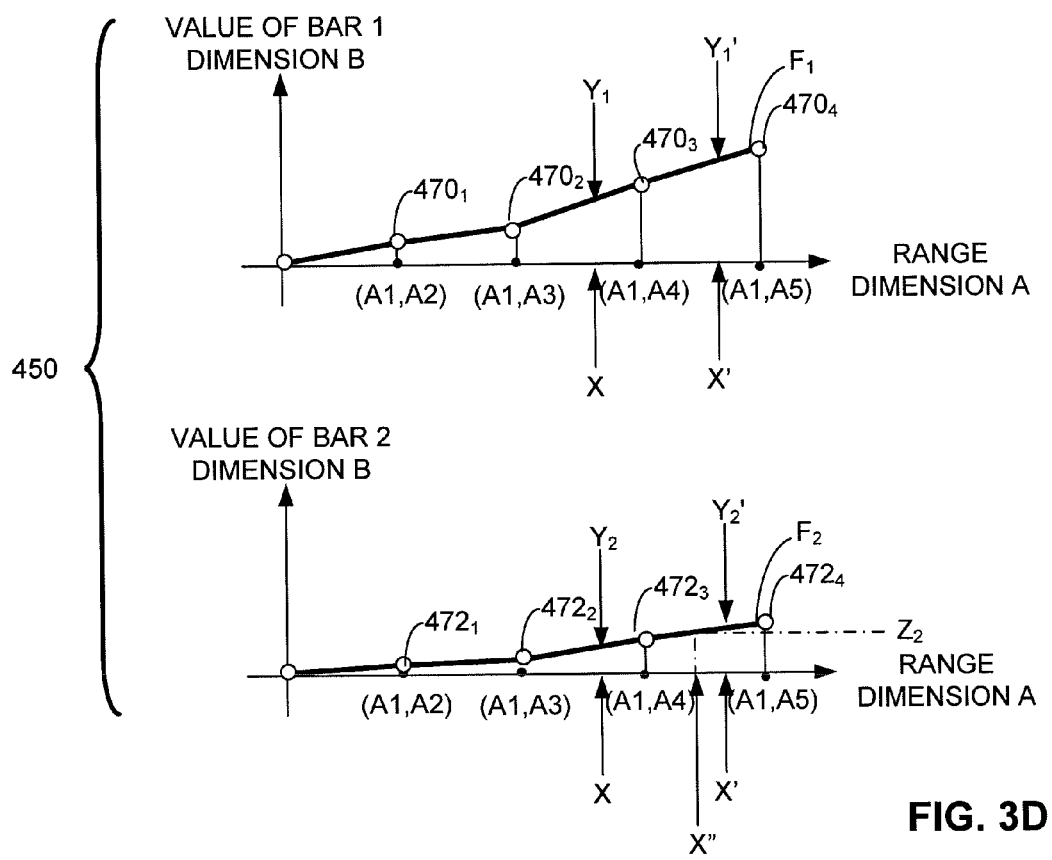
FIG. 3D is a schematic representation of a portion of the samples that constitute a summary of the data set of FIG. 3A and the manner in which the samples may be used to generate a graphical user interface through which a user may explore filtering criteria.

FIGS. 3B, 3C and 3D illustrate a process by which this summarization may be performed. The data may be summarized based on filtering relationships. Each filtering relationship may indicate a number of values in the data set matching various filtering criteria in a first dimension, which may be a "master dimension" and various filtering criteria in one or more other dimensions, which may be regarded as "subordinate dimensions." As a result, the summary may be regarded as a multivariate function, indicating, as a dependent variable, numbers of item in the data set that match filtering criteria in each of multiple dimensions, which may be regarded as the independent variables of the function.

In the example illustrated, the summarization is performed based on a dimension, designated as the master dimension. If the dimension designated as the master changes, the summarization process may be repeated. In the embodiment illustrated, the summary may include information relating distributions of items in others of the dimensions, designated as the subordinate dimensions, for each of multiple possible ranges of values of the master dimension that may be specified as a filter criteria. Though, in some embodiments, a summarization may be based on more than one "master" dimension such that relationships between multiple master dimensions and one or more subordinate dimensions may be gleaned from a data summary.

FIG. 3B illustrates graphically numbers of items in the data set meeting filtering criteria in a master dimension and one subordinate dimension. In this case, the numbers of items are illustrated as distributions of the number of items along the subordinate dimension. The figure shows distributions in a second dimension, such as dimension B, for each of multiple ranges of values in dimension A. In this example, dimension A may be regarded as the master dimension and dimension B may be regarded as a subordinate dimension. The distribution in dimension B may be considered as representative of a filtering criteria because, if the data set were further filtered by a value in dimension B associated with a point in the distribution, the distribution indicates the number of items in the filtered data set.

In this example, the distributions in dimension B are depicted as histograms, which each bar is the histogram associated with a value in dimension B. The height of the bar indicates the number of items in the filtered data set having a value in dimension B corresponding to the value associated with the bar. A histogram is an appropriate representation of the distribution in a dimension for which values along that dimension are constrained to have one a number of discrete values. In embodiments in which the values along a dimension are not constrained to discrete values, the distribution could be represented by a continuous function. Though, even when the values are not constrained, a histogram may be an appropriate way to represent a distribution of items along a dimension, with each bar representing a number of items having a value falling within a range of values in that dimension in a range associated with that bar. Accordingly, histograms may also characterize distributions of continuous, ordered values. In such cases, each "bar" of the histogram represents the number of values in a range from some low value to a higher one. Often, the ranges are of equal size, but they need not be. Such a range may be associated with a distribution of continuous values. Though, each bar in a histogram may also be associated with a range of discrete values.

FIG. 3B shows four such histograms, histogram $460_1$, $460_2$, $460_3$ and $460_4$. Each of the histograms corresponds to a different range of values in dimension A that may be specified as a filter criteria. For example, histogram $460_1$ represents the distribution of items along dimension B when the data set is filtered to include only items having a value of dimension A between A1 and A2. Similarly, histogram $460_2$ depicts the distribution along dimension B when the data set is filtered for values in dimension A between A1 and A3. Similarly, histogram $460_3$ represents the distribution of items along dimension B for a further possible range that may be specified as a filter criteria in dimension A. In this example, that range is between a value of dimension A of A1 to A4. Histogram $460_4$ illustrates a similar distribution of values along dimension B when the filter criteria in dimension A is a range between A1 and A5.

Though FIG. 3B shows distributions generated for only four possible ranges that could serve as filter criteria in dimension A, it should be appreciated that this number is shown for simplicity, but more than for filter criteria may be used to generate distributions. In particular, ranges may be generated by based on combinations of possible values for upper and lower limits for the filter criteria. It should also be noted that, FIG. 3B illustrates possible ranges in which the lower limit of the range is the same for all of the illustrated ranges. In many scenarios, possible ranges will include any possible value in the dimension as a lower limit of a range and any possible value (so long as it is higher than the lower limit) as the upper limit of the range. For example, even if only five possible values along dimension A are considered, possible ranges in dimension A may additionally include (A2, A3), (A2, A4), (A2, A5), (A3, A4), (A3, A5) and (A4, A5).

On the contrary, it should also be appreciated that in summarizing data set 400, it is not necessary to generate a distribution along dimension B for every possible combination of values in dimension A that may be selected to specify a range for a filter criteria. Rather, the ranges for which distributions are generated may represent a sampling of the possible ranges that may be generated. As a specific example, for a dimension in which there are 100 possible values, 5,000 ranges could be specified. However, regardless of the number of possible ranges that may be specified, in some embodiments the data set may be summarized by selecting 64 ranges in dimension A and distributions along dimension B for each of those selected ranges may be generated.

Regardless of the number of samples of possible ranges in dimension A that are selected, the resulting distributions along dimension B may be represented in a fashion that may be used as a summary of the data set. The distributions along dimension B may be described by a set of functions, each function indicating a number of items with a particular value in dimension B. Each of the function may have as independent variables a lower limit and an upper limit of a range in dimension A that may serve as filter criteria.

For preparing a summary, it is not a requirement that a function be generated for every possible value in dimension B. Rather, functions can be prepared for a sampling of values for ranges of values. In embodiments in which the distribution along dimension B is represented as a histogram, the bars on the histogram may be used to define a sampling of values along dimension B for which a function is generated by generating a separate function for each bar. Though, it should be appreciated that sampling in dimension B may be done at coarser intervals, such as for every other bar on the histogram.

FIG. 3C provides a simplified illustration of how the distributions $460_1 \ldots 460_4$ illustrated in FIG. 3B may be represented by functions defining the heights of corresponding bars in the distributions. For example, function $F_1$ describes the height of the first bar in the distribution along dimension B as a function of the range specified in dimension A. In this illustration, for simplicity of illustration, only one independent variable, namely the upper limit of the range, is shown to change such that function $F_1$ appears to be a one-dimensional function. In some embodiments, function $F_1$ will depend on both the upper and lower limit of the range in dimension A and will be a two-dimensional function.

Function $F_1$ may be described in any suitable way. For example, mathematical techniques to fit a curve to a set of sampled data points are known. As a result of such techniques, parameters defining the curve fitted to the sample points may be generated and, along with values of those parameters for other possible values along dimension B, may serve as the summary. Though, the function $F_1$ may also be described by the values of the sample points. Specifically, in the example of FIG. 3C, the function $F_1$ may be represented in the data summary by a list of values, each value in the list indicating the height of the first bar in the histogram representing the distribution along dimension B for a data set that has been filtered by one of ranges representing a sample for dimension A.

FIG. 3D illustrates that the summary 450 may be represented by information defining the height of each bar in the distributions $460_1 \ldots 460_4$. Though FIG. 3D illustrates only two such functions for simplicity, it should be appreciated that a separate function may be provided for each of the bars in the distributions along dimension B. The number of bars in the distributions may in turn depend on the resolution with which values are presented on a graphical user interface. However, as a specific example, a distribution may contain 15 or 20 bars. Accordingly, summary 450 may contain information representing 15 or 20 functions to fully represent the distribution along dimension B as a function of the possible ranges in dimension A.

The functions may be represented in any suitable way. However, in the embodiment illustrated, each function is represented by a set of samples. As a specific example, FIG. 3D shows that function $F_1$ is represented by samples $470_1$, $470_2$, $470_3$ and $470_4$. These values correspond to the height of the first bar in the distributions $460_1$, $460_2$, $460_3$ and $460_4$, as illustrated in FIG. 3C. Likewise, function $F_2$ may be described by samples $472_1$, $472_2$, $472_3$ and $472_4$. These samples correspond to the heights of the second bar in the distributions $460_1 \ldots 460_4$ as illustrated in FIG. 3C.

Though not expressly illustrated in FIG. 3D, other sets of samples may similarly be provided to represent the heights of other bars in the distributions illustrated in FIG. 3C. In this way, the entire distribution of FIG. 3C, showing the distribution in dimension B for sampled values of ranges that may act as filter criteria in dimension A, is represented.

In this example, dimension A represents a master dimension and dimension B represents a subordinate dimension. Similar sets of histograms may be generated from data set 400 to show distributions along each of the other dimensions that may act as a subordinate dimension. In this specific example of FIG. 3A, additional sets of histograms may be generated for each of dimensions C and dimension D. These histograms may similarly be represented by a set of functions, with each function describing the height of a bar in the histogram representing the distribution along the subordinate dimension. In this way, a complete summary may be generated for the data set 400. Though this summary will contain values representing multiple functions in multiple dimensions, the total amount of information required to represent these functions may be relatively small in relation to the total size of data set 400. Accordingly, the summary may be readily transmitted to a user's device.

Accordingly, the entire summarization may be fully captured by a small set of numerical coefficients, usually representing an interpolation function. These coefficients are constructed on the server (a non-interactive process) and transmitted to the client. The interactive client on the computer evaluates the interpolation function given inputs from the subordinate sliders, and this evaluation process is efficient enough that it can be done at interactive speeds, even if the construction process takes longer. Constructing the summarization (e.g., coefficients of interpolation functions) requires accessing the un-summarized database, which in the embodiments illustrated is accessed on the server and is relatively slow (can't usually be done at interactive speeds); evaluating the summarization in response to sliders or other controls does not require the whole data set (can be done on the client without constant streaming connection to the server) and is relatively fast (can be done at interactive speeds in response to mouse or touch-screen).

In some embodiments, a user enters a search query from a client device and a data set having items with values corresponding to multiple dimensions is generated on a server computer. So that the user can interactively and efficiently determine a desired filter criterion for the data set, the server computer summarizes the data set and transmits the summary to the client device. The user subsequently interacts with the client device, which uses the summary to allow the user explore various filter criteria for the data set on the client device independently from the server computer.

Though, it is not a requirement that the data set be generated in response to a query or that the summary be generated in response to user input. In other embodiments, a server computer contains one or more data sets having items with values corresponding to multiple dimensions. Prior to any query from a client device, the server may summarize each data set to yield a summary specific to each data set. When a user accesses a data set, the server computer may transmit the appropriate data summary to the client device.

FIG. 4 provides an example of a portion of a data set 500 that includes a plurality of items having items described by values in multiple dimensions. In the example, the data set 500 includes data related to real estate. The data set includes items such as houses, condos, townhouses, multi-family homes and land, each of which are indicated by identifiers. In particular, identifiers 502 and 504 represent house 1 and house 2; identifiers 506 and 508 represent condo 1 and condo 2; identifiers 510 and 512 represent townhouse 1 and townhouse 2; identifiers 514 and 516 represent multi-family home 1 and multi-family home 2; and identifier 518 represents a plot of land. Similarly, data set 500 values for multiple dimensions that describe the items. More specifically, a value in dimension 520 indicates the selling price of the real estate property; a value in dimension 522 represents the number of bedrooms in the property; a value in dimension 524 indicates the number of bathrooms in the real estate property; a value in dimension 526 represents the amount of square feet of the real estate property; a value in dimension 528 represents the year the property was built; a value in dimension 530 indicates the amount of square feet that are by the waterfront. Other information may also be included in the data set. For example, category 532 indicates whether a foreclosure action has been brought on the property. For example, condo 2 indicated by identifier 508, according to the dimensions provided, has a listing sale price of $400 k, has 2 bedrooms, has 2 bathrooms, has 1000 square feet, was built in 2003, has 0 square feet by the waterfront. It can be appreciated that a data set 500 can include any appropriate number of items as well as any suitable number of categories that describe items represented by the identifiers.

FIGS. 5-11 now provide an illustrative example of a graphical user interface 600 where a user is able to dynamically explore various filter criteria for a data set based on a summary of the data set and using methods provided herein. In particular, the example of FIGS. 5-11 illustrates an interactive sequence for exploring filter criteria for real estate properties, similar to the subject matter provided in FIG. 4.

In the scenario illustrated, the user has provided an initial query implicitly by logging onto a web service that provides real estate information. In this example, user interface 600 includes regions 670 and 680 that permit a user to identify portions of the data set that are of interest, further qualifying the search query. In this regard, a user may choose which items in a database of real estate information will be included the data set. For example, region 670 contains controls that provide the ability for a user to include certain types of real estate property. As shown in FIGS. 5-11, the user has activated certain of these controls to generate instructions to the server to include houses, townhouses, condos and multi-family homes, yet has excluded plots of land. Similarly, region 680 contains controls that provide the ability for a user to specify other types of real estate property. In this example, the user has included realtor listings and listed foreclosures. Accordingly, in some embodiments, once selections are made in regions 670 and 680, yielding a particular data set, a summary will be generated based on a data set that incorporates those selections.

In this example, dimension 610, corresponding to price, has been designated as a master dimension. Such a designation may be pre-programmed into the search system. Though, in other embodiments, a system may accept user input to designate a dimension as a master dimension.

Figure 5:
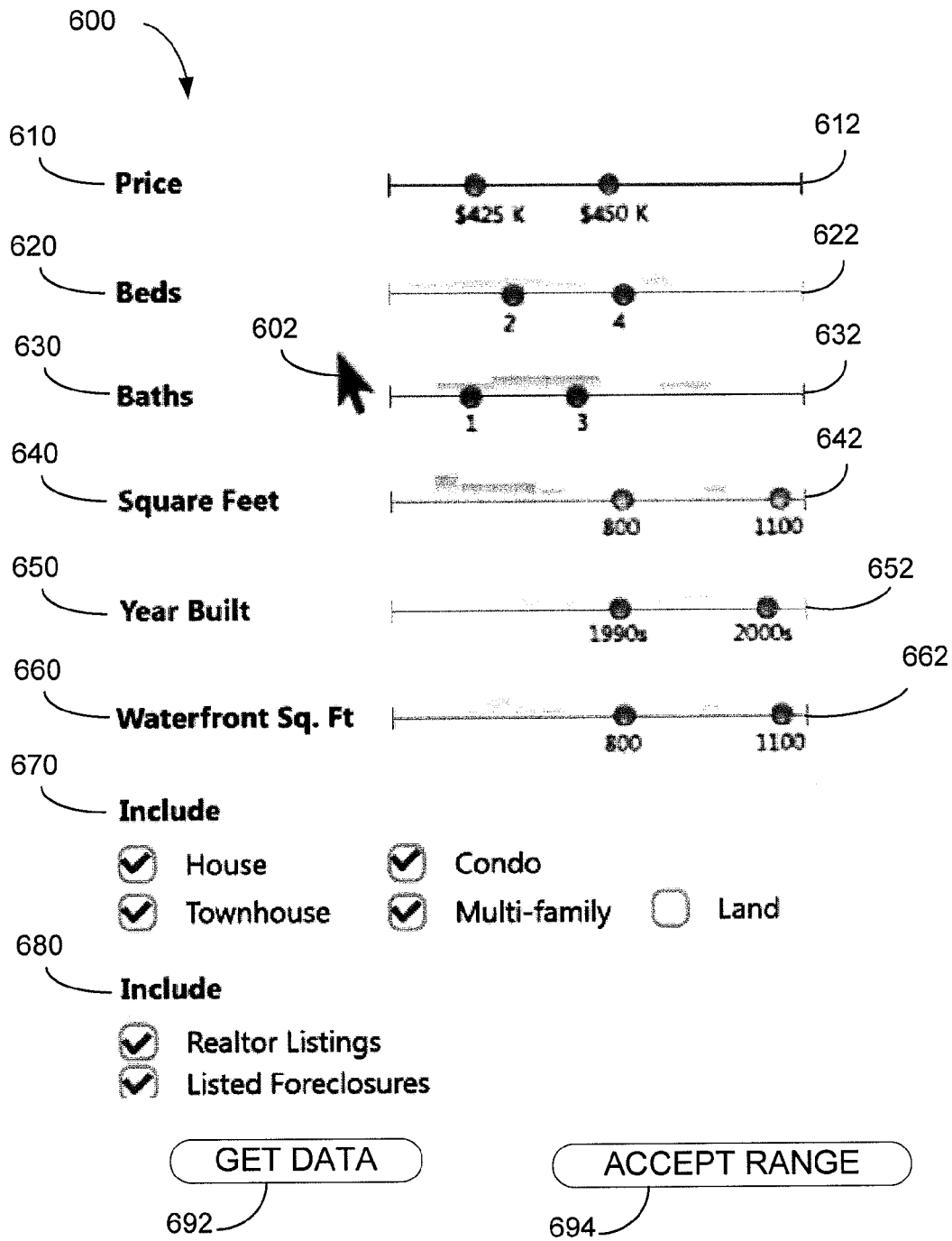
FIG. 5 is an illustrative example of a user interface through which a user is able to specify filter criteria to be applied to filter the data set.

In the operating state shown in FIG. 5, a server has identified a relevant data set and has generated a summary of the data set. The summary may be generated using a process as illustrated in FIGS. 3A . . . 3D, or in any other suitable way. In this example, the generated summary has been transmitted to a client device and the client device has used the summary to generate sliders 612, 622, 632, 642, 652 and 662.

In the scenario in which price is designated as the master dimension, the summary may provide a distribution of items in each of the subordinate dimensions as a function of price ranges that can be specified as filter criteria. Accordingly, once a range is specified for a price, the client device may use the summary to determine a distribution in each of the subordinate dimensions. Accordingly, each of the sliders associated with a subordinate dimension may include superimposed on it a histogram representing the distribution in the associated dimension.

A user may provide input through graphical user interface 600 in any suitable way. In this example, a user utilizes pointer 602 to interact with the graphical user interface 600 using techniques as are known in the art. For example, pointer 602 is able to activate controls that include certain dimensions in the display, designate a dimension as a master, adjust ranges, and/or indicate a value of a bar on a bar graph.

In this example, sliders are shown for each of multiple selected dimensions. Dimension 610 indicates selling price of real estate property. Slider 612 includes controls that indicate a range for the sale price. In this case, the controls allow a user to separately specify a lower and upper end of the range. A user may activate these controls to specify the range. These ranges may be used to specify filter criteria that may be applied by a server to select from a data set particular items meeting a user's criteria. For example, when a user activates the GET DATA control 692, the client computer may transmit to the server a request for a data set filtered by criteria specified by the positions of the controls on each of the sliders. In response, the server may generate a data set that is returned to the client device for display to the user. Though, it should be appreciated that any suitable mechanism may be used to trigger the server to generate and transmit to the client device a filtered data set.

In FIGS. 5-11, dimensions indicated as the subordinate dimensions include bar graphs that illustrate the distribution of items in the data set as filtered by the range prescribed by the master dimension. In the scenario illustrated, the price range shown for dimension 610 is between $425 k and $450 k and the distribution of items in the data set having a price between $425 k and $450 k is illustrated for each dimension by the bar graphs.

In this scenario, dimension 620 represents a number of bedrooms in a real estate property. A slider 622 includes controls that allow a user to indicate a range of a number of bedrooms for a particular real estate property, which may be used as a filter criterion. A bar graph associated with the slider 622 illustrates the approximate number of items in the data set that have various numbers of bedrooms and that have a price within the price range specified by controls on slider 612. As shown, in dimension 620, there are more properties that have two bedrooms falling within the $425 k-$450 k price range than properties that have one bedroom.

The bar graph associated with slider 622 may be generated based on the data summary. As described above in connection with FIGS. 3A . . . 3D, the data summary may include information from which histograms of distributions of items along each of the subordinate dimensions may be determined. The bar graph associated with slider 622 may be generated based on the portions of the summary describing those histograms associated with subordinate dimension 620, here representing a number of bedrooms. In this example, the relevant histogram is to be generated for the data set filtered by the criteria defined for the price range on slider 612, acting as the master dimension.

As described above in connection with FIGS. 3C and 3D, the data summary includes distributions in the subordinate dimension for different ranges within the master dimension. If one of the histograms in the data summary is generated for the specific range selected through slider 612, that histogram may be used directly to generate the bar graph in connection with slider 622. However, as described above, histograms of distributions in the subordinate dimensions are provided for only a sampling of the possible ranges that may exist for the master dimension. Accordingly, the data summary may not directly contain a histogram corresponding to the range that has been set in connection with slider 612.

Nonetheless, values for the bar graph in connection with slider 622 may be generated from the summary using an interpolation operation. As described above, each range of values associated with the master dimension may be defined by a pair of values, one representing the lower end of the range and one representing the higher end of the range. In this case, that pair of values is ($425K, $450K). That pair of values may not correspond to a sample in the master dimension for which histograms were generated. However, FIG. 3D illustrates that a value for the bars in a histogram may be determined for any pair of values defining a range in the master dimension using an interpolation process.

For example, the point X in FIG. 3D corresponds to a possible range for which no histogram has been computed.

However, as can be seen, the value X falls between other values defining a range in the master dimension. Any suitable interpolation technique, whether now known or hereafter developed, may be used to determine an appropriate value for each bar of the histogram. As a specific example, if the specified range corresponds to the point X in FIG. 3D, a value of the first bar in a histogram to be displayed in connection with slider 622 may be generated using interpolation on function $F_1$. Interpolation in this fashion may identify a value of $Y_1$ as the height of the first bar on the histogram to be displayed in conjunction with slider 622 based on specific settings for a range in the master dimension. A value for the second bar in the histogram in slider 622 may be generated based on the function $F_2$. Through interpolation, the value $Y_2$ may be generated in a similar manner. The values of other bars in the histogram to be displayed in conjunction with slider 622 may be similarly generated from the summary using the other functions generated for other bars in the histograms illustrated in FIG. 3C. A similar interpolation process may be used to generate bar graphs for other sliders associated with other subordinate dimensions, which may also be represented in the data summary.

For example, dimension 630 represents the category having to do with the number of bathrooms included in a real estate property. A slider 632 illustrates the number of bathrooms for real estate properties while bar graphs associated with the slider 632 depict the approximate number of items provided in the data set that have a certain amount of bathrooms and that cost within the price range provided by the master dimension. As depicted, in dimension 630, there are more properties having three bathrooms that fall within the $425 k-$450 k price range than properties having one bathroom.

Similarly, for square footage of real estate, dimension 640 indicates the category that pertains to the number of square feet that the property includes. A slider 642 depicts the square footage of various properties. Bar graphs corresponding to the slider 642 show the approximate number of items in the data set that have a certain square footage and that cost within the price range depicted. In dimension 640, there are more properties that fall within the $425 k-$450 k price range that have less than 800 square feet than there are having more than 800 square feet and falling within the above price range.

Dimension 650 represents the year the property was built. A slider 652 depicts the years that various properties were built. Bar graphs relating to the slider 652 depict an approximate number of items in the data set that were built in a particular year and that are selling within the price range indicated by the master dimension.

For square footage of real estate properties that are disposed near a waterfront, dimension 660 provides a category having to do with the number of square feet that the property includes adjacent to a waterfront. A slider 662 shows the square footage of various properties near a waterfront. Bar graphs corresponding to the slider 662 depict the approximate number of items in the data set that have a certain square footage near a waterfront and that cost within the $425 k-$450 k price range provided by the master dimension.

Figure 6:
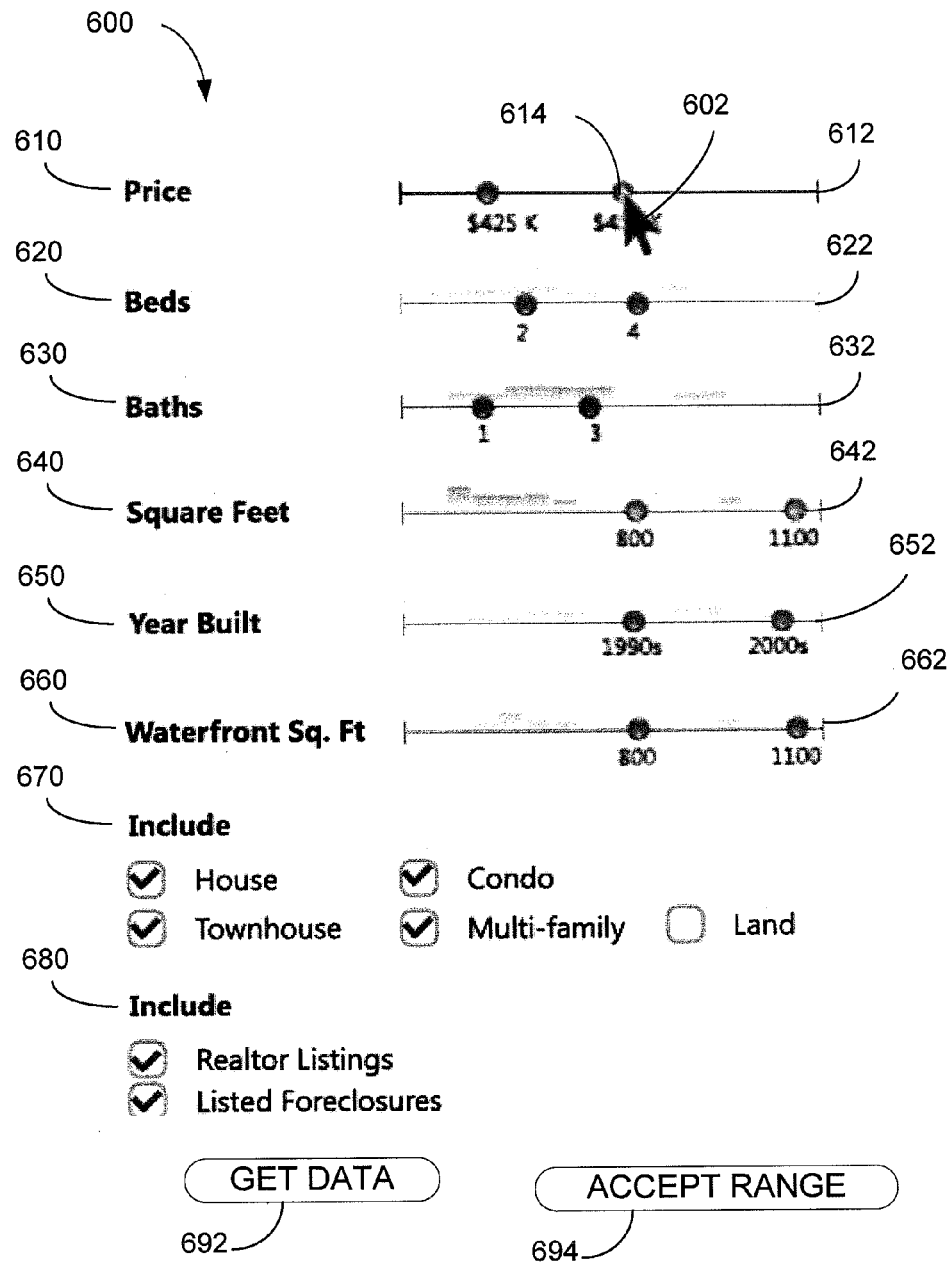
FIG. 6 is an illustration of the user interface of FIG. 5 in a state in which a filter criteria corresponding to a range of a master dimension is being adjusted.
Figure 7:
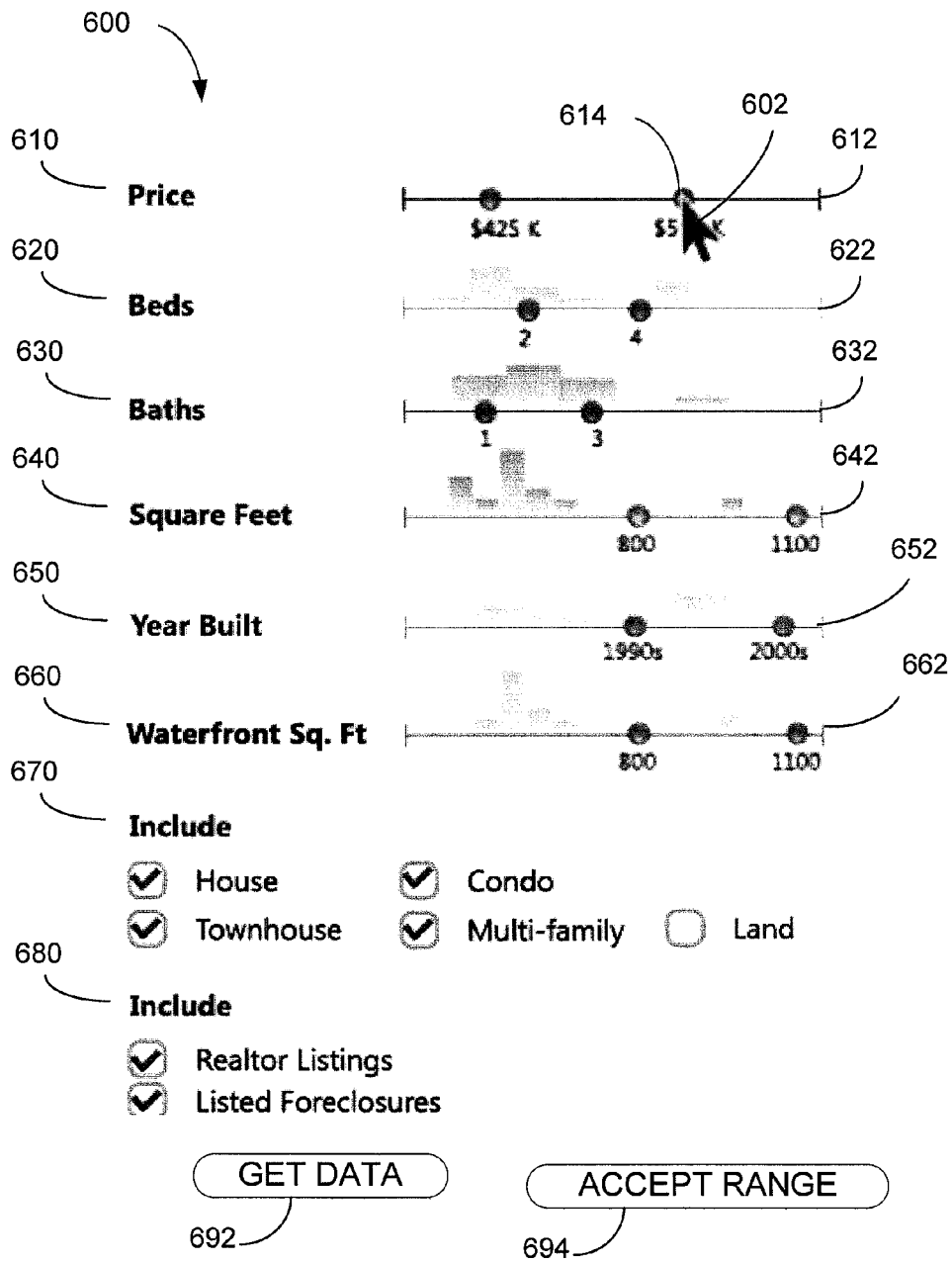
FIG. 7 is an illustration of the user interface of FIG. 6 where the range of the master dimension is increased.

If the user provides input to change the range of the master dimension, the client device can use the data summary to quickly update the bar graphs associated with each of the subordinate dimension. As illustrated in FIG. 6, pointer 602 is maneuvered over to slider 612 of dimension 610. In particular, pointer 602 is positioned over the upper limit of the price range, at $450 k. Upon selecting the control 614 that depicts the upper limit at $450 k, the user will be able to adjust the range of prices provided by the master dimension. It can be appreciated, as shown in FIG. 7, that as the user increases the price range for dimension 610, which is currently selected to be the master dimension, the number of items that fall within that price range, depicted by distributions of respective bar graphs in the other dimensions, increase. Generally, broadening the price range for property will provide more options as to what can be purchased under various specifications. Similarly, narrowing a price range would decrease the number of options available under certain specifications.

In FIG. 7, the user has manipulated pointer 602 to increase the price range determined by slider 612 by moving the upper limit control 614 to $550 k. The price range has now changed from between $425 k and $450 k to between $425 k and $550 k. Accordingly, as control 614 is moved to broaden the price range, the bar graphs for the other dimensions are dynamically increased. The client computing device may, in response to user input moving the specified range of the master dimension, re-compute the distributions associated with one or more of the subordinate dimensions.

In the example of FIG. 3D, changing the range specified as a filter criteria associated with the master dimension may, for example, be equivalent to changing the range from position X to position X'. In this example, range X' also does not correspond to a sampled range. Though, values for each of the bars in a histogram may be computed by interpolation. In the schematic illustration of FIG. 3D, when the range is changed to X', the interpolated value for the first bar of a subordinate dimension may be computed through interpolation as $Y_1'$. The value of the second bar in the histogram may be likewise computed through interpolation as $Y_2'$. Other values for other bars in the histogram may similarly be computed through interpolation, as can values for histograms associated with other subordinate dimensions. Accordingly, all of the bar graphs associated with each of the subordinate dimensions may be updated in response to a change in a range associated with the master dimension without interacting with the server that stores the data set from which results may ultimately be obtained.

With the changed range for the master dimension, there are more items in the data set that correspond to the broadened price range, as illustrated by the general increase in respective bar graphs. So that the user experience is highly interactive and that bar graph adjustments for the other dimensions is dynamic, the summary is evaluated with the constraints given by the sliders so that the numbers for items at particular values for each of the other dimensions are quickly provided. Accordingly, a computer processor interacts with the summary rather than the actual data set that the summary represents.

A system as described herein may alternatively or additionally support other types of user interaction for exploring filter criteria. For example, a reverse solution may be explored. In such a scenario, a user may input information about a desired distribution in a subordinate dimension and the system may compute a range in the master dimension that, if applied as a filter criteria, would yield that distribution in the subordinate dimension. In the embodiment illustrated, a user may indicate a desired distribution in the subordinate dimension by indicating a desired value for a bar in a bar graph illustrating the distribution of items along the subordinate dimension.

Figure 8:
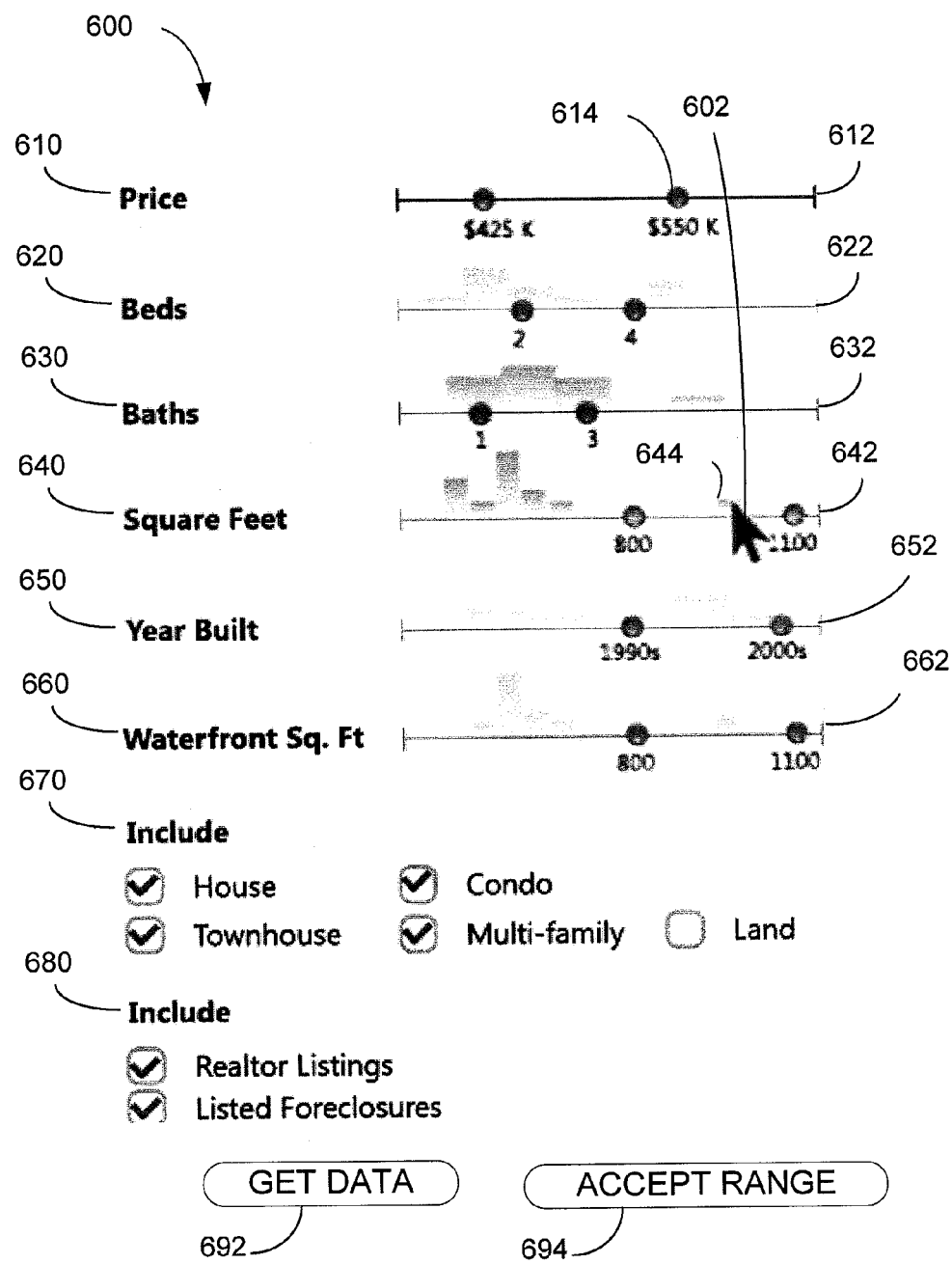
FIG. 8 is an illustration of the user interface of FIG. 7 in a state in which a particular value in a subordinate dimension is being specified.

FIG. 8 illustrates a user maneuvering pointer 602 to bar 644 of slider 642, which corresponds to the square feet dimension 640. In particular, bar 644 has a height indicating a number of properties that meet the limits of the search query and fall within the price range set on slider 612 and that have a square footage of about 1000. By selecting bar 644 and moving a mouse or other input device to change the position of pointer 602, the user is able to specify a number of properties having a square footage of about 1000 that the user would like to see in the filtered search results.

Figure 9:
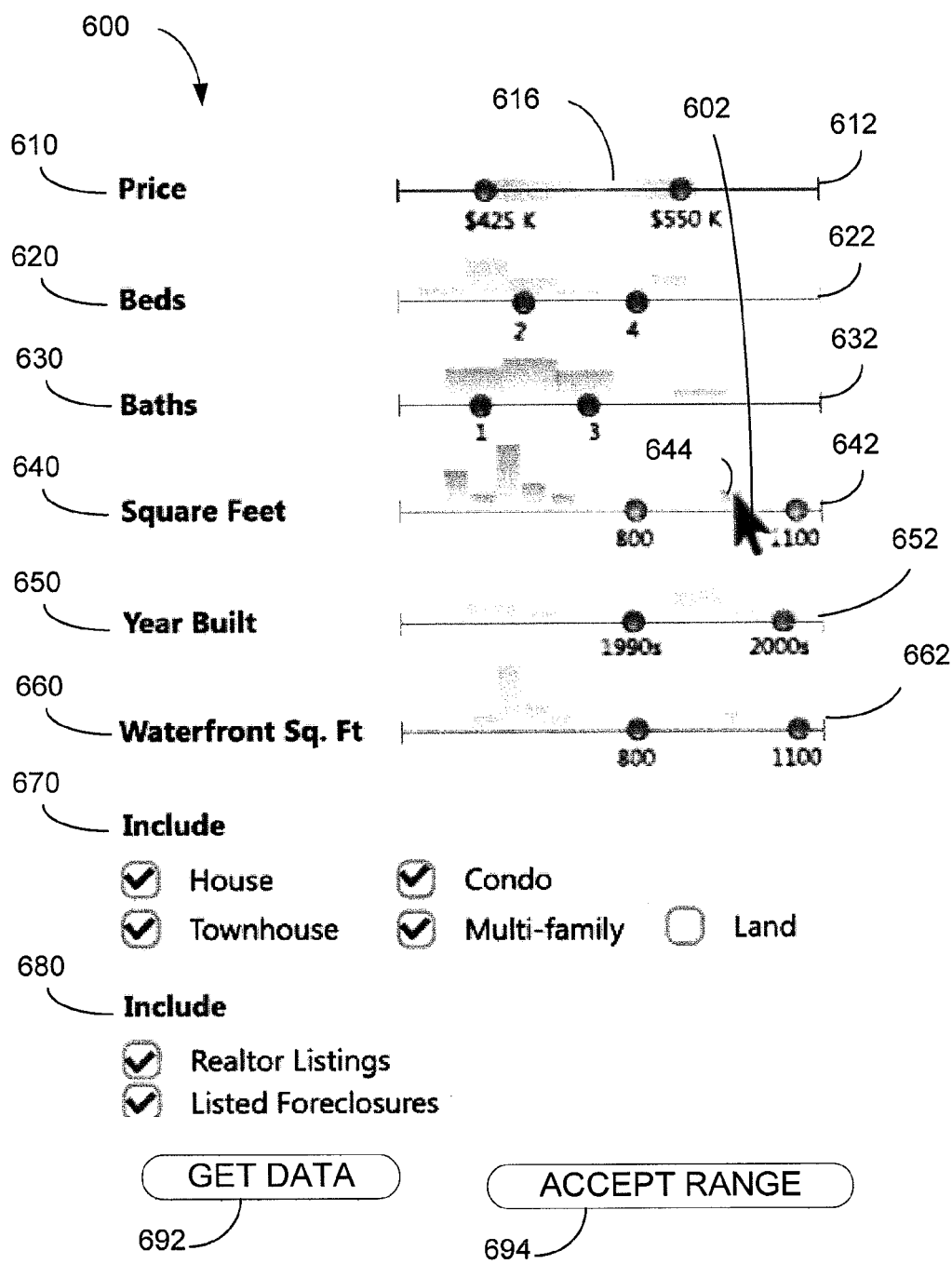
FIG. 9 is an illustration of the user interface of FIG. 8 where the number of items for the particular value in the subordinate dimension is being specified.

As the number of properties having about 1000 square feet changes, the system may dynamically compute a price range that generates this number of properties. This computation may also be performed on a client device based on the data summary. In FIG. 9, the user has selected the bar 644 that corresponds to the number of properties that have about 1000 square feet. Accordingly, the highlighted price range 616 of dimension 610 that generates this number is highlighted. In the scenario of FIG. 9, the height of bar 644 was initially set based on the number of properties in the data set when filtered according to a price range of $425K to $550K. Accordingly, the highlighted price range corresponds to this price range.

Figure 10:
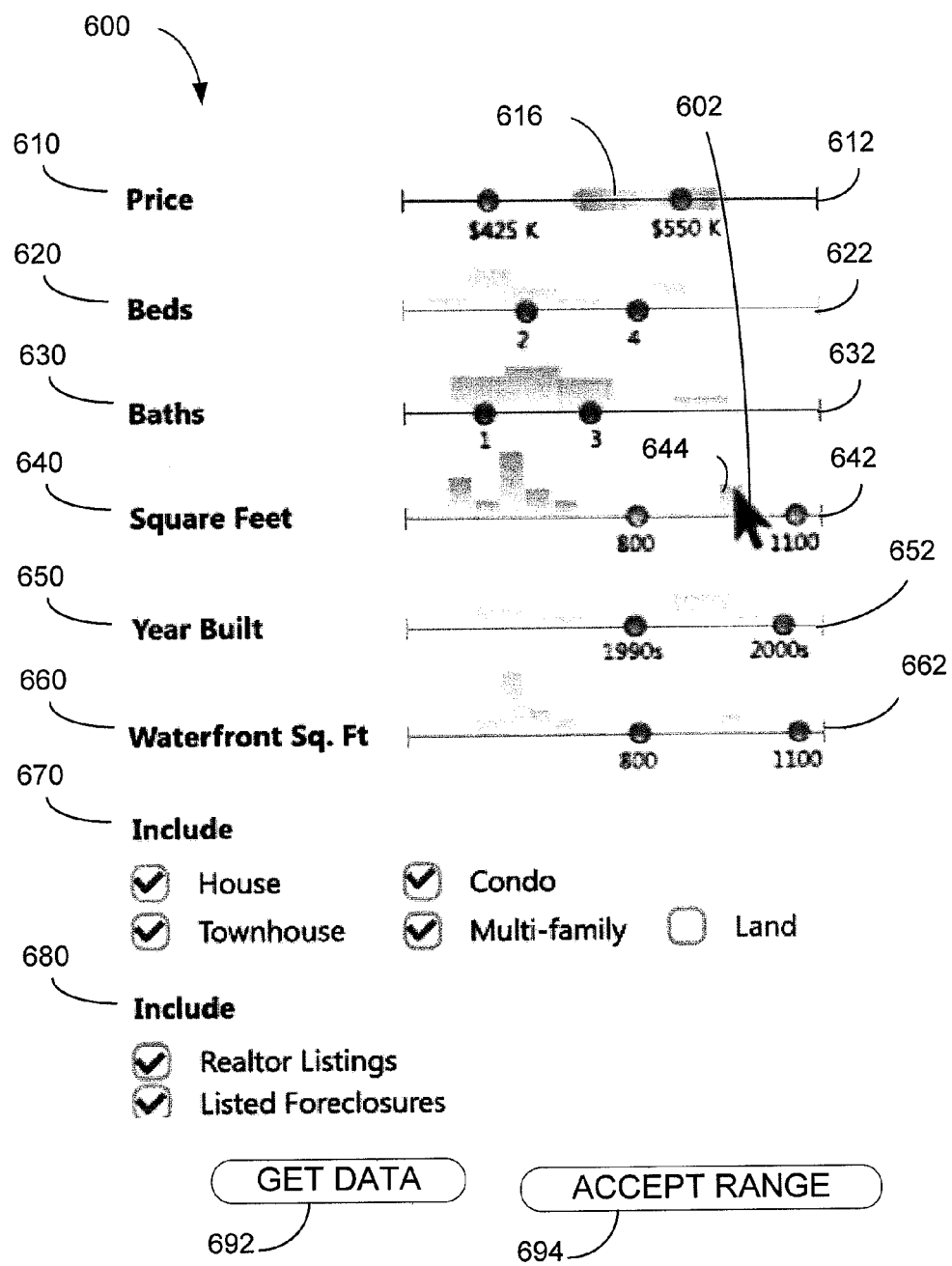
FIG. 10 is an illustration of the user interface of FIG. 9 in a state in which a range of values for the master dimension that, if specified as a filter criteria, yields the specified value for the subordinate dimension.

Turning to FIG. 10, the user has manipulated pointer 602 to increase the height of bar 644. As bar 644 is increased in size, highlighted price range 616 changes. In this case, highlighted price range 616 shifts to a greater price point, while the range is narrowed. The highlighted price range 616 may be computed by the client device based on the data summary. FIG. 3D schematically illustrates a manner in which this price range may be computed based on the summary data. In this example, a user has specified as an input a value of a bar of a histogram associated with a subordinate dimension. The functions illustrated in FIG. 3D each correspond to values of bars in a histogram for a subordinate dimension. By selecting the function corresponding to the bar that has been manipulated by the user, a reverse solution may be applied to determine a range of the master dimension that would yield the value for the bar specified by the user.

A reverse solution is schematically illustrated in FIG. 3D in connection with function $F_2$. In this example, $F_2$ is taken to be a function that defines the distribution of times along a subordinate dimension associated with square feet 640. Function $F_2$ may be associated with a specific bar in that distribution. Here that bar is taken to be bar 644 (FIG. 10). Accordingly, user input specifying a height of bar 644 corresponds to a user specifying a value $Z_2$ of function $F_2$. As can be seen in FIG. 3D, function $F_2$ has a value $Z_2$ for a range X". The value X" indicates the highlighted range 616 in the master dimension.

Reverse solution techniques are known in the art and any suitable reverse solution technique, whether now known or hereafter developed, may be used to identify the value X" from an input $Z_2$. As described above, the function $F_2$, though illustrated schematically in one dimension in FIG. 3D is a two-dimensional function relating independent variables defining the upper and lower end of a range in a master dimension to a dependent variable representing a number of items in the data set having a particular value in a subordinate dimension.

However, techniques for find a reverse solution of such a multidimensional function are known. In the examples illustrated, the functions in the data summary are bi-monotonic such that standard solution techniques such as "hill climbing" may be used to generate a reverse solution as illustrated. Though, regardless of the specific technique used to determine the appropriate range in the master dimension from the data summary, that range may be determined quickly in response to user input altering a distribution along a subordinate dimension and may be used to update graphical user interface 600 in response to that user input to indicate a new highlighted range 616.

In this example, it should be noted that the input $Z_2$ does not correspond to a value of $F_2$ for which a sampled value of the function is stored as part of the data summary. Nonetheless, a reverse solution technique may be applied by generating the function $F_2$ by interpolating between the sampled values that are present in the data set.

Any suitable interpolation technique may be used to generate the representation of function $F_2$ for applying a reverse solution technique. In an embodiment, cubic (e.g., bi-cubic) interpolation is used to generate a continuous representation of a function from a data summary. For example, bi-cubic interpolation may be accomplished using either Lagrange polynomials, cubic splines or cubic convolution algorithms. In another embodiment, bilinear interpolation or nearest-neighbor interpolation is utilized.

Figure 11:
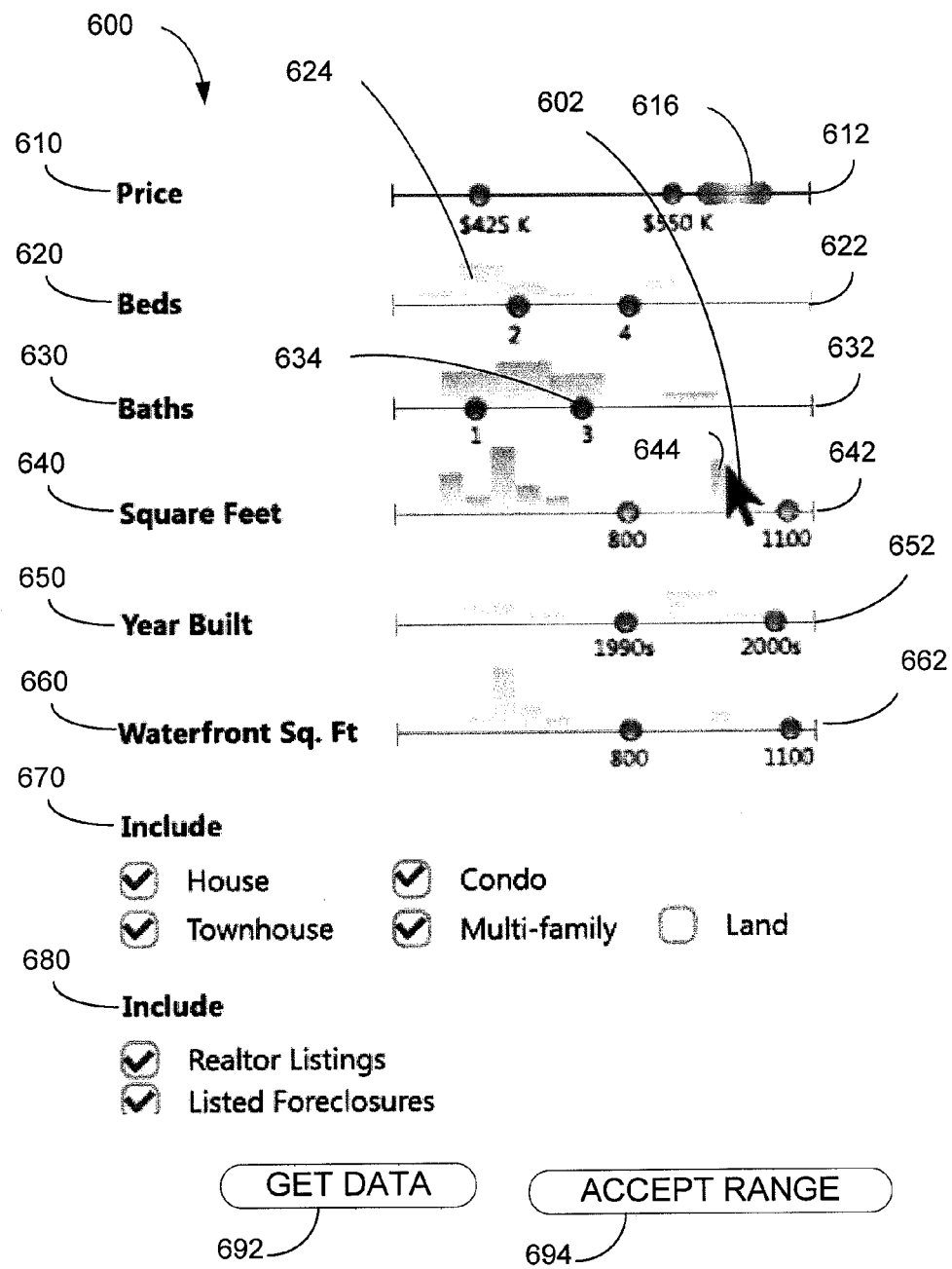
FIG. 11 is an illustration of the user interface of FIG. 10 where a specified value for the subordinate dimension is further increased.

In FIG. 11, a user has provided input further increasing bar 644 such that the user computer has recomputed highlighted price range 616 and graphical user interface 600 has been visually adjusted. In this example, by adjusting the number of real estate properties that have 1000 square feet, the highlighted price range for the master dimension is adjusted accordingly.

In this example, the data summary is applied so that the highlighted price range is dynamically adjusted while the user raises bar 644 on the square feet dimension 640 corresponding to the number of properties in the data set that have 1000 square feet. If, upon adjusting the bar 644, the user deems the resulting range for the master dimension is appropriate, the user may indicate that the highlighted range 616 be accepted, such as by activating a control 694. In this scenario, the controls (of which control 614 is numbered) indicating the range for dimension 610 may be adjusted to correspond to highlighted range 616.

Conversely, if upon viewing the change in user interface 600, the user may provide an input that indicates that the user does not accept the highlighted range 616 as a filter criteria. In that scenario, the user computer may revert the user interface 600 to the state shown in FIG. 8 or take some other appropriate action.

Although not shown, it can be appreciated that other bars on the graph associated with dimension 640 may be similarly adjusted or bars of graphs associated with other dimensions may be selected by a user and appropriately adjusted. For example, a user could maneuver pointer 602 to bar 624 of dimension 620 that corresponds to the number of properties having 1 bedroom. Given that price dimension 610 is still selected as the master dimension, adjustment of bar 624 would, accordingly, result in highlighted price range 616 being dynamically adjusted while portions of other dimensions remain constant.

Additionally, a different master dimension may be selected and the above described process may be re-applied. For example, dimension 630 may be selected as a new master dimension. In the embodiment illustrated in which a data summary relates a master dimension to each of the subordinate dimensions, designating a new master dimension may trigger a user device presenting user interface 600 to issue a request to a server implementing the search system to generate a new data summary. The new data summary could be used to generate new bar graphs along the relevant dimensions as the user provides input. For example, a user could maneuver pointer 602 to upper limit icon 634 of dimension 630, which represents properties with a certain number of bathrooms. Subsequent adjustment of upper limit icon 634 would result in bar graphs for the other dimensions, including price dimension 610, to appropriately change.

Because the sliders in the user interface 600 may be rendered by a computing device from a data set summary that is downloaded and then used to compute changes in response to user inputs, the sliders may be highly interactive, with little or no discernible latency in the appearance of changes in the displayed distributions and ranges when particular settings are changed. In contrast, as sizes of data sets become larger, querying an actual data set containing raw data structures would likely incur significant computational time. The summarized data being computationally easier to work with than the raw data, in combination with a reduced need to interact with a server, provides the ability to evaluate and investigate filter criteria in a real time interaction.

In this way, the user may explore filter criteria that generate search results with a desired number of appropriately filtered items. As the user observes the effects of changing distributions along some dimensions on the range of filter criteria along another dimension, and observes the effect of changing the range of filter criteria on the distributions along other dimensions, the user may select appropriate filter criteria for one or more of the dimensions. As illustrated in FIGS. 5-11, each of the sliders associated with a dimension may include controls that can be manipulated to specify a range of values along that dimension that may act as a filter criteria.

Once the user has completed exploring of filter criteria and is satisfied with the number of items that fall within the parameters set forth through interactive exploring, the user may gain access to filtered data from the actual database subject to the desired criteria. For example, a user may activate control 692, causing the client computer to generate a request for the filtered data set based on the current setting of the controls on each of the sliders.

Figure 12:
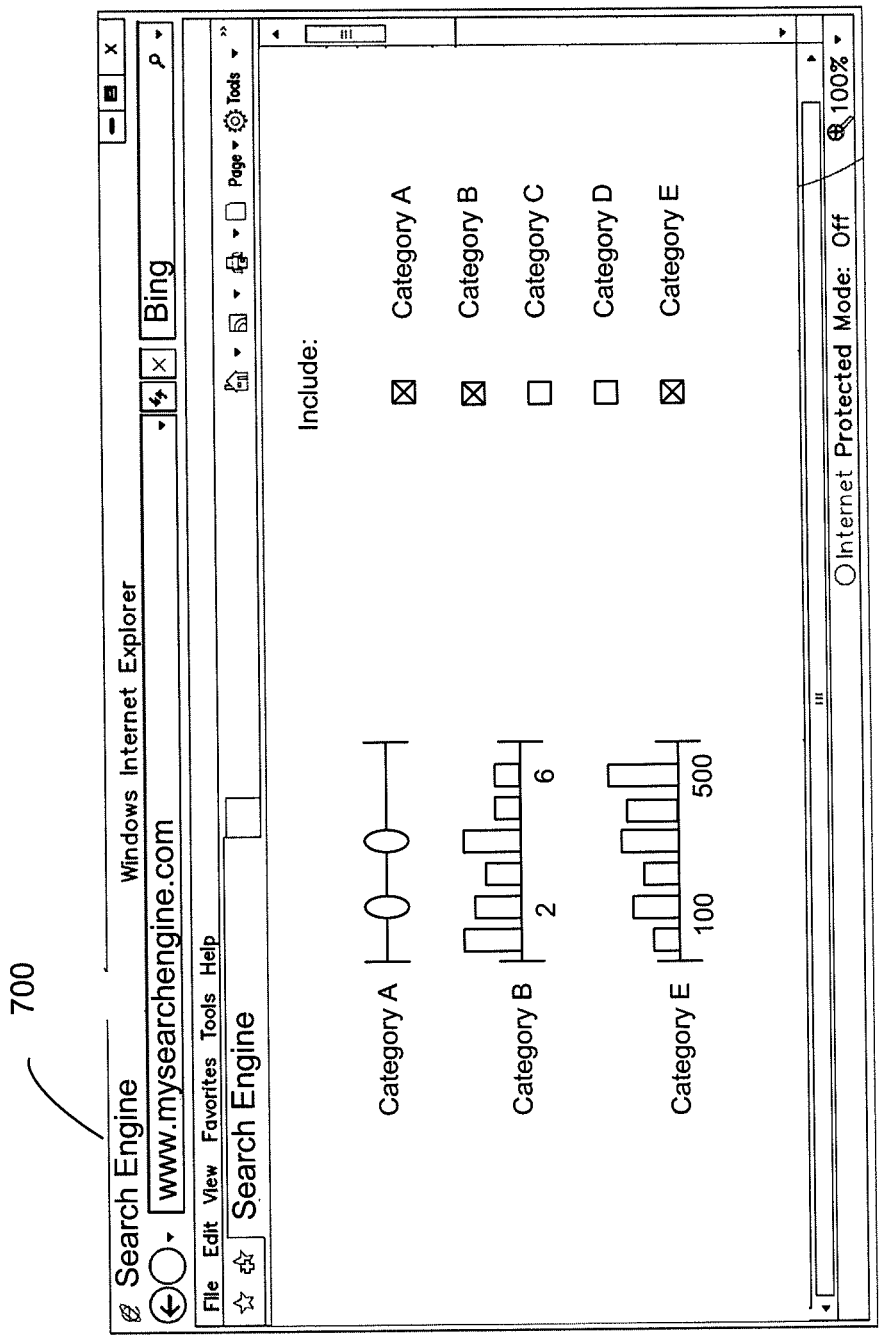
FIG. 12 is an example of a user interface through which a user may search for data and interactively explore filter criteria.

FIG. 12 is a further example of a user interface via which a user may interactively explore filter criteria from a data set that has been summarized. In this example, a user first searches for information related to a particular area and discovers a database full of potentially relevant information. The user may then choose which categories of data are important and visually explore filter parameters for the data. FIG. 12 illustrates the interface being displayed by a web browser 700, although any suitable application to generate a user interface may be used. The web browser 700 may be any suitable web browser, illustrated in this example as being INTERNET EXPLORER® developed by Microsoft Corporation, and may execute on a computing device operated by the user (e.g., computing device 105 of FIG. 1). It can be appreciated that the interactive display shown in FIG. 12 is similar to that shown previously for FIGS. 5-11, though, disposed in web browser 700.

It should be understood that user interfaces could include any suitable interactive mechanism. As such, user interfaces are not required to include sliders and/or bar graphs, or even be graphical in nature. Rather, a suitable user interface may include text command prompts for a user to input adjusted ranges and/or numbers of items that correspond to a specified value of a category. When the user enters an adjusted range for a master dimension, for example, the number of items for other dimensions may be automatically output for the user to observe. Similarly, when the user modifies the number of items for a particular value in a dimension other than the master dimension, the corresponding range adjustment of the master dimension can be automatically output to the user.

Having thus described several aspects of at least one embodiment of this invention, it is to be appreciated that various alterations, modifications, and improvements will readily occur to those skilled in the art.

For example, it is described that a data summary relates one dimension of a data set, designated as the master, to each of multiple other dimensions, designated as the subordinate dimensions, taken one at a time. In some embodiments, the summary may include relationships among more than two dimensions. In such embodiments, a user may input desired values for two or more dimensions concurrently, and the system may compute a value for a further dimension that yields those desired values.

Also, adjusting filter criteria with one dimension identified as a master dimension is described. If it is desired for other filter criteria to be explored to observe filtering relationships of other features of data, the user may select a different master dimension and repeat a similar process. Alternatively, the data summary is described as relating the master dimension to each subordinate dimension separately. Functions relating more variables could be used in the summary such that the summary indicates relationships between a master dimension and multiple subordinate dimensions. Conversely, the summary could be defined to include relationships between two or more master dimensions and subordinate dimensions. By creating such multi-dimensional functions to summarize the data, values along multiple dimensions could be varied and results in one or more other dimensions could be observed or projected.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of operating a search service on a server to aid a user in filtering information, the method comprising:
with at least one processor:
receiving a user query from a user at a remote client device;
retrieving, from the server, a data set corresponding to the subject matter of the user query, the data set comprising a plurality of items, the items in the data set having a value in each of a plurality of dimensions;
generating a summary of the data set, after both retrieving the data set in response to execution of the user query and excluding the items in the data set retrieved in the response to the execution of the user query, based on the items in a master dimension in the plurality of dimensions, the summary describing a plurality of filtering relationships, each of the filtering relationships indicating a number of items in the data set matching possible filtering criteria in a first dimension of the plurality of dimensions and filtering criteria of at least one other of the plurality of dimensions, wherein a new summary, excluding the items in the data set, is generated based on an interaction with the summary to designate a second dimension of the plurality of dimensions as the master dimension; and
transmitting the summary to the remote client device in response to the user query without transmitting one or more items in the data set to the remote client device,
wherein the transmitted summary enables the user to dynamically interact with the filtering criteria based on the transmitted summary for arriving at a desired filter criteria, on the remote client device without requiring additional interaction between the remote client device and the server.

2. The method of claim 1, wherein:
generating the summary comprises generating, for each of the plurality of filtering relationships, a set of samples, each sample indicating a number of items in the data set that have a value in one of a discrete number of ranges of values of the first dimension and one of a discrete number of ranges of values of the at least one other dimension.

3. The method of claim 1, wherein generating the summary comprises generating, for each of the plurality of filtering relationships, a representation of a multivariate function mapping a range of values of the first dimension and a range of values in the at least one other dimension to a number of items in the data set.

4. The method of claim 1, wherein:
retrieving the data set comprises executing the user query based in part on search criteria received from the client device.

5. The method of claim 1, wherein:
the first dimension is selected in response to receiving from the client device a designation of the master dimension.

6. The method of claim 1, wherein the filtering criteria comprises adjustment of a range of values of the first dimension of the plurality of dimensions and a filtering relationship of the plurality of filtering relationships indicates a number of items in the data set for the at least one other of the plurality of dimensions that have values that fall within the adjusted range of values of the first dimension.

7. The method of claim 1, wherein the filtering criteria comprises adjustment of a number of items in the data set of the at least one other of the plurality of dimensions and a filtering relationship of the plurality of filtering relationships indicates a range of values of the first dimension of the plurality of dimensions that correspond to the adjusted number of items in the data set of the at least one other of the plurality of dimensions.

8. A method of operating a computing device for providing information about a data set, the data set comprising a plurality of items, the items in the data set having a value in each of a plurality of dimensions, the method comprising:
submitting a user query to a remote search service;
receiving a summary only both in response to the submitted query and excluding the data set retrieved from the search service in the response to execution of the submitted user query, wherein the summary, without including the data set, describe a plurality of filtering relationships, each of the filtering relationships indicating a number of items in the data set matching filtering criteria in a first dimension of the plurality of dimensions and filtering criteria of at least one other of the plurality of dimensions;
rendering a graphical user interface, based on the summary, indicating, for each of the plurality of second dimensions, a distribution of the number of items in the data set matching the filtering criteria in the first dimension, the distribution depicting a distribution of the items along the second dimension;
receiving user input relating to a change in values for at least one selected dimension of the plurality of dimensions on the rendered graphical user interface; and
in response to receiving the user input, modifying at least one of the indicated distributions of the graphical user interface based on the summary of the data set received from the remote search service without additional interaction with the remote search service, wherein a new summary is received from the remote search service based on a request using the summary when another user input designates a third dimension in the plurality of dimensions as the first dimension.

9. The method of claim 8, wherein:
receiving the user input relating to a change in a filter criteria associated with at least one selected dimension of the plurality of dimensions comprises receiving user input indicating a change in a filter criteria associated with the first dimension; and
modifying the at least one of the indicated distributions of the graphical user interface based on the summary comprises modifying an indicated distribution for each dimension of the plurality of dimensions other than the first dimension, based on a filtering relationship of the plurality of filtering relationships.

10. The method of claim 9, wherein:
receiving the user input indicating a change in a filter criteria associated with the first dimension comprises adjusting a range of values of the first dimension; and
modifying the indicated distribution for each dimension of the plurality of dimensions other than the first dimension comprises indicating a number of items in the data set having values that fall within the adjusted range of values of the first dimension.

11. The method of claim 8, further comprising:
receiving user input designating the first dimension as a master dimension.

12. The method of claim 8, wherein:
receiving the user input relating to a change in a filter criteria associated with at least one selected dimension of the plurality of dimensions comprises receiving user input indicating a desired number of items in the data set meeting filter criteria associated with the selected dimension, the selected dimension being a dimension other than the first dimension; and
modifying at least one of the indicated distributions of the graphical user interface based on the summary comprises highlighting a range of values for the first dimension.

13. The method of claim 12, wherein:
receiving the user input indicating a desired number of items in the data set meeting filter criteria associated with the selected dimension comprises receiving user input indicating a height of a bar in a displayed histogram.

14. The method of claim 12, wherein:
the summary comprises a plurality of samples for each of the plurality of filtering relationships; and
modifying the indicated distribution for the first dimension comprises interpolating between samples for a filtering criteria providing a relationship involving the first dimension and the at least one selected dimension.

15. The method of claim 8, wherein:
receiving the summary of the data set comprises downloading the summary from a server device, wherein the summary is a three-level approximations of the data set, a first level approximation is a statistical summary based on approximate data in the data set, a second level approximation is a visual representation of the statistical summary subject to one or more errors resulting from down-scaling of the statistical summary to a small screen, and a third level approximation is an approximation of the statistical summary.

16. The method of claim 8, further comprising:
submitting a query for identifiers corresponding to the distribution of the number of items in the data set having the value.

17. The method of claim 13, wherein:
receiving user input relating to a change in a filter criteria comprises receiving user input adjusting a slider on an interactive display.

18. A method of providing information, the method comprising each of the following as executed by a computer processor:
receiving from a user a search query;
transmitting the search query to a search system;
receiving from the search system a summary of a data set, wherein the summary of the data set is generated, by excluding the data set, in response to execution of the transmitted search query, the data set comprising a plurality of items, the items in the data set having a value in each of a plurality of dimensions, the summary, excluding the data set, describing a plurality of filtering relationships, each of the filtering relationships indicating a number of items in the data set matching filtering criteria in a first dimension of the plurality of dimensions and filtering criteria in each of a plurality of others of the plurality of dimensions, wherein the summary, excluding the data set, enables the user to interact with the filtering criteria on the data set on a client device remote from the search system without requiring additional interaction by the search system, the summary is received without the plurality of items of the data set;

based on the summary of the data set, determining the plurality of dimensions, rendering a graphical user interface by excluding the data set, and indicating, for each of the plurality of dimensions, a distribution of a number of items in the data set having the value;

receiving user input, concurrently, relating to a change in values for at least two or more dimensions of the plurality of dimensions; and in response to receiving the user input, modifying at least one of the indicated distributions of the graphical user interface based on the summary excluding the data set.

19. The method of claim 18, wherein:

receiving the user input relating to a change in a filter criteria comprises receiving user input to change a range associated with a slider.

20. The method of claim 18, wherein:

receiving the user input relating to a change in a filter criteria comprises receiving user input to change a height of a bar of a histogram displayed in association with a slider.

* * * * *